United States Patent
Yamate et al.

(10) Patent No.: US 8,379,649 B2
(45) Date of Patent: Feb. 19, 2013

(54) ARRANGEMENTS FOR CONSTRUCTING A VIRTUAL PRIVATE NETWORK (VPN) USING FORWARDING TECHNIQUES

(75) Inventors: Keiichirou Yamate, Hadano (JP); Shinji Nozaki, Kawasaki (JP); Masaya Arai, Atsugi (JP)

(73) Assignee: Alaxala Networks Corporation, Kanagawa (JP)

( * ) Notice: Subject to any disclaimer, the term of this patent is extended or adjusted under 35 U.S.C. 154(b) by 869 days.

(21) Appl. No.: 12/493,360

(22) Filed: Jun. 29, 2009

(65) Prior Publication Data

US 2010/0080235 A1 Apr. 1, 2010

(30) Foreign Application Priority Data

Sep. 29, 2008 (JP) ................................. 2008/251280

(51) Int. Cl.
*H04L 12/28* (2006.01)
(52) U.S. Cl. ................................. 370/395.31
(58) Field of Classification Search .................. None
See application file for complete search history.

(56) References Cited

U.S. PATENT DOCUMENTS

| | | | |
|---|---|---|---|
| 7,471,631 B2 * | 12/2008 | Kang et al. | 370/235 |
| 7,519,731 B1 * | 4/2009 | Enns | 709/238 |
| 7,574,738 B2 * | 8/2009 | Daude et al. | 726/15 |
| 7,623,535 B2 * | 11/2009 | Guichard et al. | 370/409 |
| 7,643,488 B2 * | 1/2010 | Khanna et al. | 370/392 |
| 7,688,829 B2 * | 3/2010 | Guichard et al. | 370/395.31 |
| 7,742,477 B1 * | 6/2010 | Guichard et al. | 370/392 |
| 8,005,049 B2 * | 8/2011 | Cheng et al. | 370/331 |
| 2003/0037163 A1 * | 2/2003 | Kitada et al. | 709/236 |
| 2004/0088542 A1 * | 5/2004 | Daude et al. | 713/156 |
| 2004/0223498 A1 * | 11/2004 | Sanderson et al. | 370/395.52 |
| 2004/0223500 A1 * | 11/2004 | Sanderson et al. | 370/395.53 |
| 2005/0120089 A1 * | 6/2005 | Kang et al. | 709/213 |
| 2005/0188106 A1 * | 8/2005 | Pirbhai et al. | 709/238 |
| 2006/0126496 A1 * | 6/2006 | Filsfils et al. | 370/216 |
| 2007/0058638 A1 * | 3/2007 | Guichard et al. | 370/395.31 |
| 2007/0248103 A1 * | 10/2007 | Delaney et al. | 370/395.52 |
| 2008/0092229 A1 * | 4/2008 | Khanna et al. | 726/15 |
| 2010/0254396 A1 * | 10/2010 | Oman | 370/401 |
| 2011/0032843 A1 * | 2/2011 | Papp et al. | 370/254 |

OTHER PUBLICATIONS

Rosen et al., "BJP/MPLS IP Virtual Private Networks (VPNs)", Feb. 2006.
AX7800/AX7700R Software Manual, Applications Guide, vol. 1, Ver. 10.2 compatible, AX-10-002-d0.
Kobayashi et al., "High Speed Protocol Processing Architecture for Giga-bit Multi-layer Switch LSI" Technical Report of IEICE, Mar. 1998.

\* cited by examiner

*Primary Examiner* — Ayaz Sheikh
*Assistant Examiner* — Faiyazkhan Ghafoerkhan
(74) *Attorney, Agent, or Firm* — Antonelli, Terry, Stout & Kraus, LLP.

(57) ABSTRACT

An extranet direct route allowing extranet forwarding to a directly linked device is written in a layer 2-layer 3-integrated forwarding table. The procedure of introducing a layer 3 address-to-layer 2 address correspondence relation table entry into the layer 2-layer 3-integrated forwarding table searches the layer 2-layer 3-integrated forwarding table with a layer 3 address of the correspondence relation table entry and a layer 3 interface as search keys to retrieve any forwarding entry relating to an extranet direct route as a forwarding destination. The procedure subsequently extracts a VRF of each retrieved forwarding entry and introduces the correspondence relation table entry for the extracted VRF into the layer 2-layer 3-integrated forwarding table.

16 Claims, 18 Drawing Sheets

Fig.2

| LAYER 3 INTERFACE | VRF |
|---|---|
| A | 1 |
| B | 1 |
| C | 2 |
| D | 2 |
| ⋮ | ⋮ |

Fig.3A

| PACKET CONDITION | | FORWARDING DESTINATION | | |
|---|---|---|---|---|
| VRF | PACKET DESTINATION IP ADDRESS | LAYER 3 INTERFACE | IP ADDRESS | MAC ADDRESS |
| 1 | 10.1.1.0/24 | A | DIRECT LINKAGE | UNRESOLVED |
| 1 | 20.1.1.0./24 | A | 10.1.1.1 | UNRESOLVED |
| 2 | 20.1.1.0/24 | A | 10.1.1.1 | UNRESOLVED |
| 2 | 30.1.1.0/24 | C | 10.1.1.1 | UNRESOLVED |
| ⋮ | ⋮ | ⋮ | ⋮ | ⋮ |

| PACKET CONDITION | | FORWARDING DESTINATION | | |
|---|---|---|---|---|
| VRF | PACKET DESTINATION IP ADDRESS | LAYER 3 INTERFACE | IP ADDRESS | MAC ADDRESS |
| 1 | 10.1.1.0/24 | A | DIRECT LINKAGE | UNRESOLVED |
| 1 | 10.1.1.1/32 | A | 10.1.1.1 | R1 |
| 1 | 20.1.1.0./24 | A | 10.1.1.1 | R1 |
| 2 | 20.1.1.0/24 | A | 10.1.1.1 | R1 |
| 2 | 30.1.1.0/24 | C | 10.1.1.1 | UNRESOLVED |
| ⋮ | ⋮ | ⋮ | ⋮ | ⋮ |

| VRF | PACKET DESTINATION IP ADDRESS | LAYER 3 INTERFACE | IP ADDRESS | MAC ADDRESS | TYPE |
|---|---|---|---|---|---|
| 1 | a.a.a.a/24 | A | DIRECT LINKAGE | UNRESOLVED | ROUTE |
| 1 | b.b.b.b/32 | A | b.b.b.b | T1 | ARP |
| 1 | c.c.c.c/16 | A | b.b.b.b | T1 | ROUTE |
| 2 | d.d.d.d/24 | C | DIRECT LINKAGE | UNRESOLVED | ROUTE |
| 2 | e.e.e.e/24 | D | f.f.f.f | UNRESOLVED | ROUTE |
| ⋮ | ⋮ | ⋮ | ⋮ | ⋮ | ⋮ |

Packet condition: VRF, PACKET DESTINATION IP ADDRESS
Forwarding destination: LAYER 3 INTERFACE, IP ADDRESS, MAC ADDRESS

Fig.6

| LAYER 3 INTERFACE | IP ADDRESS | VRF LIST |
|---|---|---|
| A | a.a.a.a/24 | 1, 3 |
| B | b.b.b.b/16 | 2 |
| C | c.c.c.c/24 | 3 |
| ⋮ | ⋮ | ⋮ |

Fig.13A

VRF1 ROUTING TABLE — 501

| ADDRESS | FORWARDING DESTINATION || PRIORITY | ADOPTED |
|---|---|---|---|---|
| | IF | IP | | |
| 10.1.1.0/24 — 504 | A | DIRECT LINKAGE | 0 | ○ |

Fig.13B

VRF2 ROUTING TABLE — 502

| ADDRESS | FORWARDING DESTINATION || PRIORITY | ADOPTED |
|---|---|---|---|---|
| | IF | IP | | |
| 10.1.1.0/24 — 506 | B | 20.1.1.2 | 10 | ○ |
| 10.1.1.0/24 — 507 | A | DIRECT LINKAGE | 80 | × |
| 20.1.1.0/24 — 505 | B | DIRECT LINKAGE | 0 | ○ |

Fig.13C

VRF3 ROUTING TABLE — 503

| ADDRESS | FORWARDING DESTINATION || PRIORITY | ADOPTED |
|---|---|---|---|---|
| | IF | IP | | |
| 10.1.1.0/24 — 509 | A | DIRECT LINKAGE | 80 | ○ |
| 30.1.1.0/24 — 508 | C | DIRECT LINKAGE | 0 | ○ |

Fig.14

| VRF | PACKET DESTINATION IP ADDRESS | LAYER 3 INTERFACE | IP ADDRESS | MAC ADDRESS | |
|---|---|---|---|---|---|
| 1 | 10.1.1.0/24 | A | DIRECT LINKAGE | UNRESOLVED | ~601 |
| 2 | 10.1.1.0/24 | B | 20.1.1.2 | UNRESOLVED | |
| 2 | 20.1.1.0/24 | B | DIRECT LINKAGE | UNRESOLVED | |
| 3 | 10.1.1.0/24 | A | DIRECT LINKAGE | UNRESOLVED | ~602 |
| 3 | 30.1.1.0/24 | C | DIRECT LINKAGE | UNRESOLVED | |

Packet condition: VRF, PACKET DESTINATION IP ADDRESS. Forwarding destination: LAYER 3 INTERFACE, IP ADDRESS, MAC ADDRESS.

Fig.15

| VRF | PACKET DESTINATION IP ADDRESS | LAYER 3 INTERFACE | IP ADDRESS | MAC ADDRESS | |
|---|---|---|---|---|---|
| 1 | 10.1.1.0/24 | A | DIRECT LINKAGE | UNRESOLVED | ~601 |
| 1 | 10.1.1.1/32 | A | 10.1.1.1 | S1 | ~701 |
| 2 | 10.1.1.0/24 | B | 20.1.1.2 | UNRESOLVED | |
| 2 | 20.1.1.0/24 | B | DIRECT LINKAGE | UNRESOLVED | |
| 3 | 10.1.1.0/24 | A | DIRECT LINKAGE | UNRESOLVED | ~602 |
| 3 | 30.1.1.0/24 | C | DIRECT LINKAGE | UNRESOLVED | |

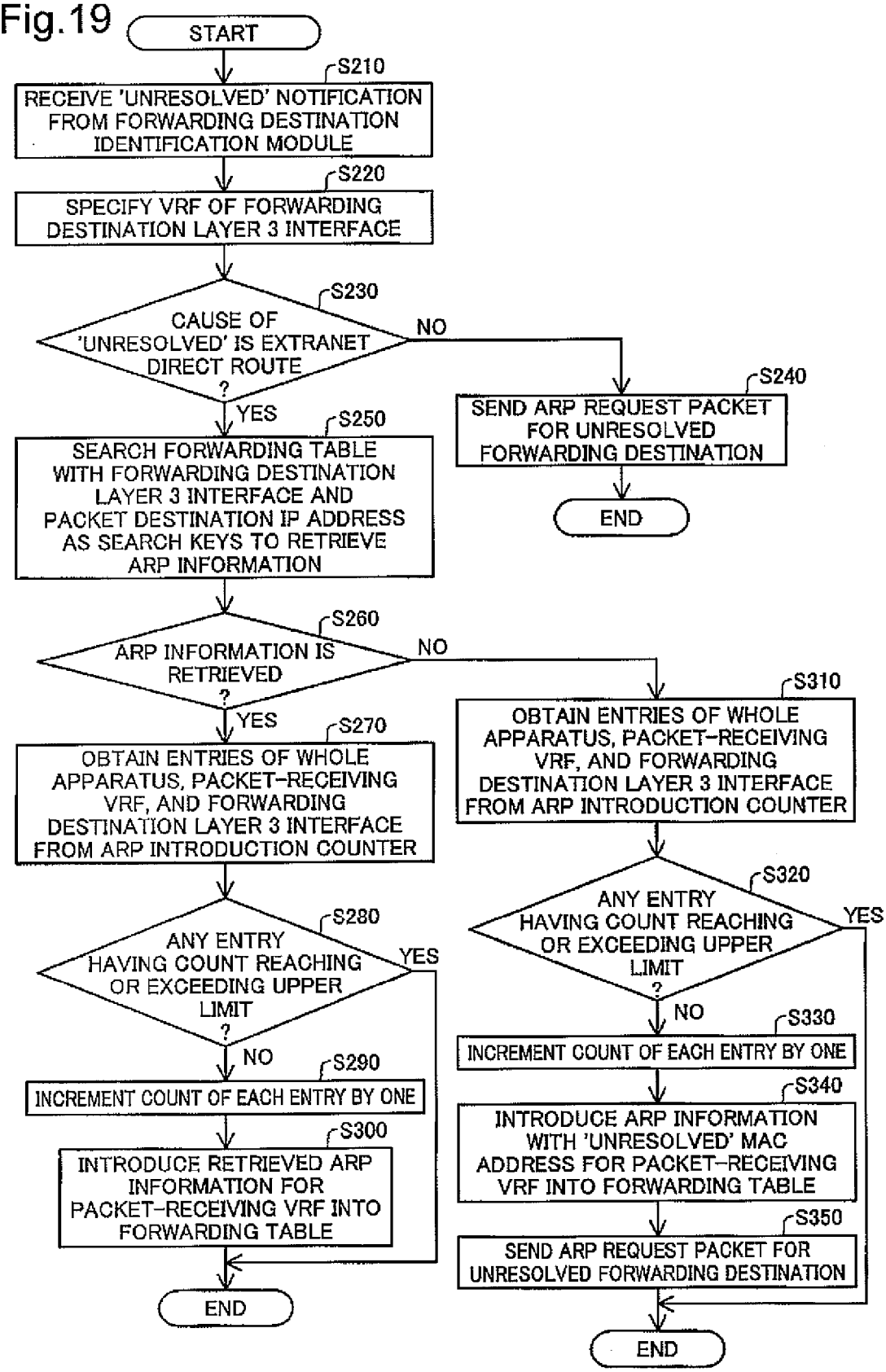

Fig.20

Table 701:

| PACKET CONDITION | | FORWARDING DESTINATION | | | TYPE | |
|---|---|---|---|---|---|---|
| VRF | PACKET DESTINATION IP ADDRESS | LAYER 3 INTERFACE | IP ADDRESS | MAC ADDRESS | | |
| 1 | 10.1.1.0/24 | A | DIRECT LINKAGE | UNRESOLVED | ROUTE | ~2001 |
| 2 | 10.1.1.0/24 | B | 20.1.1.2 | UNRESOLVED | ROUTE | |
| 2 | 20.1.1.0/24 | B | DIRECT LINKAGE | UNRESOLVED | ROUTE | |
| 3 | 10.1.1.0/24 | A | DIRECT LINKAGE | UNRESOLVED | ROUTE | ~2002 |
| 3 | 30.1.1.0/24 | C | DIRECT LINKAGE | UNRESOLVED | ROUTE | |

Fig.21

Table 701:

| PACKET CONDITION | | FORWARDING DESTINATION | | | TYPE | |
|---|---|---|---|---|---|---|
| VRF | PACKET DESTINATION IP ADDRESS | LAYER 3 INTERFACE | IP ADDRESS | MAC ADDRESS | | |
| 1 | 10.1.1.0/24 | A | DIRECT LINKAGE | UNRESOLVED | ROUTE | ~2001 |
| 1 | 10.1.1.1/32 | A | 10.1.1.1 | S1 | ARP | ~2101 |
| 2 | 10.1.1.0/24 | B | 20.1.1.2 | UNRESOLVED | ROUTE | |
| 2 | 20.1.1.0/24 | B | DIRECT LINKAGE | UNRESOLVED | ROUTE | |
| 3 | 10.1.1.0/24 | A | DIRECT LINKAGE | UNRESOLVED | ROUTE | ~2002 |
| 3 | 30.1.1.0/24 | C | DIRECT LINKAGE | UNRESOLVED | ROUTE | |

| PACKET CONDITION | | FORWARDING DESTINATION | | | TYPE | |
|---|---|---|---|---|---|---|
| VRF | PACKET DESTINATION IP ADDRESS | LAYER 3 INTERFACE | IP ADDRESS | MAC ADDRESS | | |
| 1 | 10.1.1.0/24 | A | DIRECT LINKAGE | UNRESOLVED | ROUTE | ~2001 |
| 1 | 10.1.1.1/32 | A | 10.1.1.1 | S1 | ARP | ~2001 |
| 2 | 10.1.1.0/24 | B | 20.1.1.2 | UNRESOLVED | ROUTE | |
| 2 | 20.1.1.0/24 | B | DIRECT LINKAGE | UNRESOLVED | ROUTE | |
| 3 | 10.1.1.0/24 | A | DIRECT LINKAGE | UNRESOLVED | ROUTE | ~2002 |
| 3 | 10.1.1.1/32 | A | 10.1.1.1 | S1 | ARP | ~2201 |
| 3 | 30.1.1.0/24 | C | DIRECT LINKAGE | UNRESOLVED | ROUTE | |

| PACKET CONDITION | | FORWARDING DESTINATION | | | TYPE | |
|---|---|---|---|---|---|---|
| VRF | PACKET DESTINATION IP ADDRESS | LAYER 3 INTERFACE | IP ADDRESS | MAC ADDRESS | | |
| 1 | 10.1.1.0/24 | A | DIRECT LINKAGE | UNRESOLVED | ROUTE | ~2001 |
| 2 | 10.1.1.0/24 | B | 20.1.1.2 | UNRESOLVED | ROUTE | |
| 2 | 20.1.1.0/24 | B | DIRECT LINKAGE | UNRESOLVED | ROUTE | |
| 3 | 10.1.1.0/24 | A | DIRECT LINKAGE | UNRESOLVED | ROUTE | ~2002 |
| 3 | 10.1.1.1/32 | A | 10.1.1.1 | UNRESOLVED | ARP | ~2201 |
| 3 | 30.1.1.0/24 | C | DIRECT LINKAGE | UNRESOLVED | ROUTE | |

ARRANGEMENTS FOR CONSTRUCTING A VIRTUAL PRIVATE NETWORK (VPN) USING FORWARDING TECHNIQUES

CROSS REFERENCE TO RELATED APPLICATIONS

The present application claims the priority based on Japanese Patent Application No. 2008-251280 filed on Sep. 29, 2008, the disclosure of which is hereby incorporated by reference in its entirety.

BACKGROUND

1. Technical Field

The present invention relates to a technique of constructing a virtual private network (hereafter referred to as VPN).

2. Description of the Related Art

Various techniques have been proposed as the configurations including a large number of VPNS and interconnecting the respective VPNs.

One proposed technique uses a virtual private network (VPN) routing and forwarding table. In the description hereof, the VPN routing and forwarding table or a module equipped with the VPN routing and forwarding table is referred to as 'VRF'. Functions actualized by the VRF are called 'VRF functions'. A layer 3 forwarding apparatus having the VRF functions is called a 'VRF forwarding apparatus'. The VRF forwarding apparatus has multiple VRFs with virtual forwarding functions. Each of the multiple VRFs has an individual routing table. One VRF is allocated to one VPN, and a layer 3 interface is assigned to a VRF corresponding to a VPN of a connection destination. This arrangement ensures forwarding functions of individual VPNs and enables the VRF forwarding apparatus to include multiple VPNs.

Another proposed technique allows extranet communication in the VRF forwarding apparatus by exchange of routes between VRFs in the VRF forwarding apparatus. In the description hereof, the terminology 'extranet communication' represents communication between different VPNs. In the specification hereof, a forwarding apparatus making internal extranet communication is referred to as an 'inter-VRF forwarding apparatus'.

Still another proposed technique utilizes a layer 2-layer 3-integrated forwarding table. The layer 2-layer 3-integrated forwarding table is integration of a routing table with a correspondence table (ARP table) specifying a correspondence relation of a layer 3 address to a layer 2 address of an adjacent device. The conventional configuration requires two searches in the routing table and in the correspondence table for specifying a forwarding destination of a packet, while the configuration utilizing the layer 2-layer 3-integrated forwarding table requires only one search in the layer 2-layer 3-integrated forwarding table for specifying the forwarding destination of the packet. This technique accordingly aims to increase the overall processing speed and save the electric power.

The prior art forwarding apparatus in combination with the technique of the layer 2-layer 3-integrated forwarding table, however, does not allow communication by an extranet direct route. In the description hereof, the terminology 'direct route' represents a route using a packet destination layer 3 address as a forwarding destination layer 3 address. The 'extranet direct route' represents an extranet route created by the direct route.

SUMMARY

In order to solve at least part of the problems mentioned above, there would be a demand for allowing communication by an extranet direct route in a forwarding apparatus based on the technique of layer 2-layer 3-integrated forwarding tables.

The present invention accomplishes at least part of the demand mentioned above and the other relevant demands by variety of configurations and applications discussed below.

According to one aspect, the invention is directed to a forwarding apparatus including multiple VPN routing and forwarding tables (VRFs) configured to individually have routing tables provided for respective virtual private networks (VPNs). Each of the routing tables is structured to record a communication route of a packet based on a layer 3 address specifying an address of the packet and a forwarding destination layer 3 address specifying a forwarding destination of the packet from an assigned VRF or a VRF assigned to the routing table, as well as an extranet communication route of forwarding the packet from the assigned VRF to another VRF.

The forwarding apparatus includes a first storage module configured to store a layer 2-layer 3-integrated forwarding table structured to record at least one entry. Each entry includes VRF information and a packet destination layer 3 address as search conditions for specifying the forwarding destination of the packet, as well as a forwarding destination layer 3 interface, a forwarding destination layer 3 address, and a forwarding destination layer 2 address as search results. When a correspondence relation of the forwarding destination layer 3 address to the forwarding destination layer 2 address is unresolved for an entry, the entry includes specific data representing an 'unresolved' state of the forwarding destination layer 2 address.

The forwarding apparatus also includes: a route introducer configured to introduce each communication route, which is recorded in each of the routing tables, into the layer 2-layer 3-integrated forwarding table; an address resolving module configured to introduce a correspondence relation of a layer 3 address to a layer 2 address of an adjacent device as an adjacent device layer 3 address-to-layer 2 address correspondence relation with regard to the forwarding destination layer 3 interface of an entry recorded in the layer 2-layer 3-integrated forwarding table, into the layer 2-layer 3-integrated forwarding table; and a forwarding destination identification module configured to search the layer 2-layer 3-integrated forwarding table with a layer 3 address specifying an address recorded in the packet as a search key to specify the forwarding destination of the packet.

In response to presence of an entry, which includes a direct route using a packet destination layer 3 address as the forwarding destination layer 3 address and the VRF information as the search condition for specifying the forwarding destination of the packet that is different from a VRF assigned to the forwarding destination layer 3 interface, in the layer 2-layer 3-integrated forwarding table, the address resolving module utilizes VRF information identical with the VRF information as the search condition to introduce the adjacent device layer 3 address-to-layer 2 address correspondence relation into the layer 2-layer 3-integrated forwarding table.

In the description hereof, the terminology 'adjacent device' represents a layer 3 device connecting with a layer 3 interface of the forwarding apparatus by a layer 2 network.

The entry including the direct route using the packet destination layer 3 address as the forwarding destination layer 3 address and the VRF information as the search condition for specifying the forwarding destination of the packet that is different from the VRF assigned to the forwarding destination layer 3 interface represents an extranet direct route. The forwarding apparatus according to this aspect of the invention utilizes the VRF information identical with the VRF information as the search condition to introduce the adjacent device layer 3 address-to-layer 2 address correspondence relation into the layer 2-layer 3-integrated forwarding table. The forwarding destination of the packet by an extranet direct route is identifiable by searching the layer 2-layer 3-integrated forwarding table with the layer 3 address specifying the address recorded in the packet as the search key. The forwarding apparatus of this arrangement thus allows communication by an extranet direct route.

According to another aspect, the invention is also directed to a forwarding method of forwarding a packet between multiple VPN routing and forwarding tables (VRFs) configured to individually have routing tables provided for respective virtual private networks (VPNs). Each of the routing tables is structured to record a communication route of the packet based on a layer 3 address specifying an address of the packet and a forwarding destination layer 3 address specifying a forwarding destination of the packet from an assigned VRF or a VRF assigned to the routing table, as well as an extranet communication route of forwarding the packet from the assigned VRF to another VRF.

The forwarding method provides a layer 2-layer 3-integrated forwarding table structured to record at least one entry and introduces each communication route, which is recorded in each of the routing tables, into the layer 2-layer 3-integrated forwarding table. Each entry of the layer 2-layer 3-integrated forwarding table includes VRF information and a packet destination layer 3 address as search conditions for specifying the forwarding destination of the packet, as well as a forwarding destination layer 3 interface, a forwarding destination layer 3 address, and a forwarding destination layer 2 address as search results. When a correspondence relation of the forwarding destination layer 3 address to the forwarding destination layer 2 address is unresolved for an entry, the entry includes specific data representing an 'unresolved' state of the forwarding destination layer 2 address.

The forwarding method introduces a correspondence relation of a layer 3 address to a layer 2 address of an adjacent device as an adjacent device layer 3 address-to-layer 2 address correspondence relation with regard to the forwarding destination layer 3 interface of an entry recorded in the layer 2-layer 3-integrated forwarding table, into the layer 2-layer 3-integrated forwarding table. The forwarding method searches the layer 2-layer 3-integrated forwarding table with a layer 3 address specifying an address recorded in the packet as a search key to specify the forwarding destination of the packet.

In response to presence of an entry, which includes a direct route using a packet destination layer 3 address as the forwarding destination layer 3 address and the VRF information as the search condition for specifying the forwarding destination of the packet that is different from a VRF assigned to the forwarding destination layer 3 interface, in the layer 2-layer 3-integrated forwarding table, the forwarding method utilizes VRF information identical with the VRF information as the search condition to introduce the adjacent device layer 3 address-to-layer 2 address correspondence relation into the layer 2-layer 3-integrated forwarding table.

According to still another aspect, the invention is further directed to a computer program product configured to cause a computer to forward a packet between multiple VPN routing and forwarding tables (VRFs) configured to individually have routing tables provided for respective virtual private networks (VPNs). Each of the routing tables is structured to record a communication route of the packet based on a layer 3 address specifying an address of the packet and a forwarding destination layer 3 address specifying a forwarding destination of the packet from an assigned VRF or a VRF assigned to the routing table, as well as an extranet communication route of forwarding the packet from the assigned VRF to another VRF.

The computer program product has a first program code of providing a layer 2-layer 3-integrated forwarding table structured to record at least one entry and introducing each communication route, which is recorded in each of the routing tables, into the layer 2-layer 3-integrated forwarding table. Each entry of the layer 2-layer 3-integrated forwarding table includes VRF information and a packet destination layer 3 address as search conditions for specifying the forwarding destination of the packet, as well as a forwarding destination layer 3 interface, a forwarding destination layer 3 address, and a forwarding destination layer 2 address as search results. When a correspondence relation of the forwarding destination layer 3 address to the forwarding destination layer 2 address is unresolved for an entry, the entry includes specific data representing an 'unresolved' state of the forwarding destination layer 2 address.

The computer program product also has a second program product of introducing a correspondence relation of a layer 3 address to a layer 2 address of an adjacent device as an adjacent device layer 3 address-to-layer 2 address correspondence relation with regard to the forwarding destination layer 3 interface of an entry recorded in the layer 2-layer 3-integrated forwarding table, into the layer 2-layer 3-integrated forwarding table. The computer program product further has: a third program product of searching the layer 2-layer 3-integrated forwarding table with a layer 3 address specifying an address recorded in the packet as a search key to specify the forwarding destination of the packet; and a computer readable medium configured to store the first through the third program codes.

In response to presence of an entry, which includes a direct route using a packet destination layer 3 address as the forwarding destination layer 3 address and the VRF information as the search condition for specifying the forwarding destination of the packet that is different from a VRF assigned to the forwarding destination layer 3 interface, in the layer 2-layer 3-integrated forwarding table, the third program code utilizes VRF information identical with the VRF information as the search condition to introduce the adjacent device layer 3 address-to-layer 2 address correspondence relation into the layer 2-layer 3-integrated forwarding table.

The forwarding method and the computer program product according to other aspects of the invention also allow communication by an extranet direct route, like the forwarding apparatus of the invention discussed above.

The invention is not restricted to the forwarding apparatus, the forwarding method, or the computer program product described above but may be actualized by diversity of applications, for example, a network system including the forwarding apparatus of the invention, a recording medium in which the computer program is recorded, and a computer temporally storing the computer program in the memory through the data transferring means.

BRIEF DESCRIPTION OF THE DRAWINGS

FIG. 2 is an explanatory view showing one example of the data structure of an interface VRF table in the reference example;

FIGS. 3A and 3B are explanatory views showing one example of the data structure of a forwarding table in the reference example;

FIG. 5 is an explanatory view showing one example of the data structure of a forwarding table in the first embodiment;

FIG. 6 is an explanatory view showing one example of the data structure of a direct route VRF table in the first embodiment;

FIG. 13A-13C are explanatory views showing the contents of routing tables provided in respective VRFs in the VPN network of FIG. 12;

FIG. 14 is an explanatory view showing the contents of the forwarding table after insertion of routes by the function of the route introducer in the reference example;

FIG. 15 is an explanatory view showing the contents of the forwarding table after insertion of ARP information by the function of the route introducer in the reference example;

FIG. 19 is a flowchart showing a procedure of ARP learning process performed by an ARP processing/copy introduction module in the second embodiment;

FIG. 20 is an explanatory view showing the contents of a forwarding table with introduction of routes by a route introducer based on the routing table of FIG. 13 in the inter-VRF forwarding apparatus of the second embodiment;

FIG. 21 shows the contents of the forwarding table of FIG. 20 as a result of introduction;

FIG. 22 shows the contents of the forwarding table of FIG. 20 as a result of introduction; and FIG. 23 shows the contents of the forwarding table of FIG. 20 as a result of introduction.

DESCRIPTION OF THE PREFERRED EMBODIMENTS

Some modes of carrying out the invention are discussed below as preferred embodiments in the following sequence with reference to the accompanied drawings:
A. Reference Example
  A-1. System Configuration (FIG. 1)
  A-2. Data Structures of Tables (FIGS. 2 & 3)
  A-3. Processing Operations
B. First Embodiment
  B-1. System Configuration (FIG. 4)
  B-2. Data Structures of Tables (FIGS. 5-7)
  B-3. Processing Operations (FIGS. 8-11)
  B-4. Functions and Effects
    B-4-1. Drawbacks of Reference Example (FIGS. 12-15)
    B-4-2. Functions and Effects of First Embodiment (FIGS. 16 & 17)
C. Second Embodiment
  C-1. System Configuration (FIG. 18)
  C-2. Processing Operations (FIGS. 19-23)
  C-3. Functions and Effects
D. Third Embodiment
E. Fourth Embodiment
F. Other Aspects A. Reference Example Prior to description of several embodiments according to some aspects of the invention, a reference example is explained first. The reference example is not an embodiment of the invention but is explained for better understanding of the embodiments discussed later.

A-1. System Configuration (FIG. 1)

Figure 1:
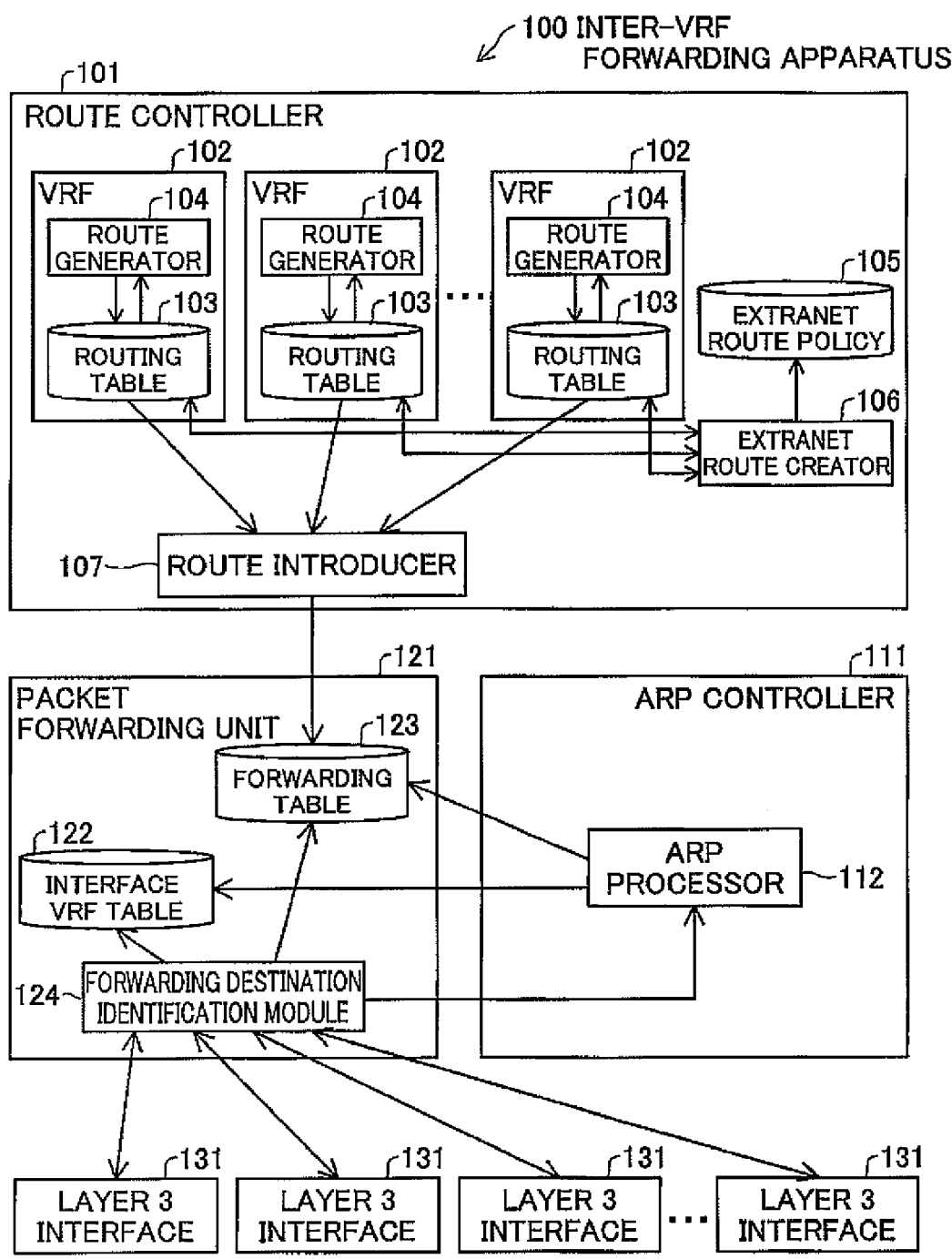
FIG. 1 is block diagram schematically illustrating the general configuration of an inter-VRF forwarding apparatus in a reference example.

FIG. 1 schematically illustrates the general configuration of an inter-VRF forwarding apparatus 100 in a reference example. The inter-VRF forwarding apparatus 100 includes a route controller 101, an ARP controller 111, a packet forwarding unit 121, and multiple layer 3 interfaces 131.

The route controller 101 has multiple VRFs 102, an extranet route policy 105, an extranet route creator 106, and a route introducer 107. Each of the multiple VRFs 102 includes a routing table 103 and a route generator 104. The route generator 104 performs series of processing according to a routing protocol to generate a route of a corresponding VRF 102 including the route generator 104. The generated route is registered in the routing table 103 of the same corresponding VRF 102.

The extranet route policy 105 stores an extranet route generation condition. The extranet route creator 106 is connected with the routing tables 103 of the respective VRFs 102 and with the extranet route policy 105. The extranet route creator 106 obtains a route from the routing table 103 of each VRF 102, refers to the extranet route policy 105 to read the extranet route generation condition, and writes a required route according to the read extranet route generation condition into the routing tables 103 of the other VRFs 102, so as to create an extranet route.

The routes written in the routing table 103 have the order of priority. Among multiple routes for an identical destination IP address (a layer 3 address defining a destination) registered in the routing table 103, one working route is selected according to the order of priority. The order of priority should be determined since the two or more route generators 104 or the route generator 104 and the extranet route creator 106 may generate routes for an identical destination IP address. Two routes are provided for an identical destination network. One route is specified as a working route, while the other route is specified as a backup route. In the event of any failure in the working route, the backup route is activated for the destination network.

The route introducer 107 is connected with the routing tables 103 of the respective VRFs 102 and with a forwarding table 123 (discussed later) in the packet forwarding unit 121. The route introducer 107 obtains the working routes from the routing tables 103 of the respective VRFs 102 and writes or introduces the obtained routes into the forwarding table 123.

The ARP controller 111 includes an ARP processor 112. The ARP processor 112 is connected with the packet forwarding unit 121. The terminology 'ARP' herein represents address resolution protocol.

The packet forwarding unit 121 includes an interface VRF table 122, a forwarding table 123, and a forwarding destination identification module 124. The interface VRF table 122 and the forwarding table 123 are connected with the forwarding destination identification module 124. The interface VRF table 122, the forwarding table 123, and the forwarding destination identification module 124 are connected with the ARP processor 112 of the ARP controller 111.

The multiple layer 3 interfaces 131 are connected with the forwarding destination identification module 124 of the packet forwarding unit 121. The forwarding destination identification module 124 obtains a received packet from each of the multiple layer 3 interfaces 131, searches the interface VRF table 122 and the forwarding table 123 to specify an adequate forwarding destination layer 3 interface as a forwarding destination of the received packet, and forwards the received packet to the specified forwarding destination layer 3 interface.

A-2. Data Structures of Tables (FIGS. 2 & 3)

FIG. 2 shows one example of the data structure of the interface VRF table 122. As illustrated, the interface VRF table 122 stores entries of a layer 3 interface 201 and a VRF 202 assigned to the layer 3 interface 201. The field names 'layer 3 interface 201' and the 'VRF 202' represent actual field data, such as 'name' and 'number', which specify the corresponding fields (items). In later description of various tables, field names similarly represent actual field data. Search of the interface VRF table 122 with the layer 3 interface 201 as a search key specifies the VRF 202 to be assigned to the layer 3 interface 201.

FIGS. 3A and 3B show examples of the data structure of the forwarding table 123. The forwarding table 123 is a layer 2-layer 3-integrated forwarding table. In the description below, it is assumed that a layer 3 interface: A is assigned to a VRF:1 and that a layer 3 interface: C is assigned to a VRF:2.

FIG. 3A shows the forwarding table 123 in an unlearnt state with learning no ARP information. FIG. 3B shows the forwarding table 123 in a learnt state with learning ARP information that correlates an IP address '10.1.1.1' of the layer 3 interface: A to a MAC address 'R1'. In the forwarding table 123, an entry 308 adopts a direct route, and an entry 309 adopts an ordinary route. An entry 310 adopts an extranet route with application of the forwarding method of the entry 309 to the VRF: 2. An entry 311 has learnt ARP information.

The forwarding table 123 stores a forwarding destination in correlation to a packet condition of each received packet. Each of the entries 308 through 311 includes a VRF or packet-receiving VRF 302 and a packet destination IP address 303 as items of a packet condition 301, as well as a forwarding destination layer 3 interface 305, a forwarding destination IP address 306, and a forwarding destination MAC address 307 as items of a forwarding destination 304. The respective fields of the forwarding table 123 are mapped to the constituents of the invention as follows. The VRF or packet-receiving VRF 302 corresponds to the VRF information as one item of the search condition for specifying a forwarding destination of each packet. The packet destination IP address 303 corresponds to the layer 3 address as another item of the search condition. The forwarding destination layer 3 interface 305 corresponds to the forwarding destination layer 3 interface.

The forwarding destination IP address 306 corresponds to the forwarding destination layer 3 address. The forwarding destination MAC address 307 corresponds to the forwarding destination layer 2 address.

The IP address 306 of the forwarding destination 304 or the forwarding destination IP address 306 may take a value representing a status 'direct linkage', in addition to actual IP addresses. This status 'direct linkage' represents a direct route without specification of the forwarding destination IP address 306. The MAC address 307 of the forwarding destination 304 or the forwarding destination MAC address 307 may take a value representing a status 'unresolved', in addition to actual MAC addresses. This status 'unresolved' means an ARP-unresolved entry without specification of the forwarding destination MAC address 307 or an ARP-unsolvable entry adopting a direct route. In the description hereafter, the VRF or packet-receiving VRF 302 as one item of the packet condition 301 may be referred to as 'packet condition VRF 302' in each of the entries 308 through 311 in the forwarding table 123. The route-based entries 308, 309, and 310 are introduced by the route introducer 107, while the ARP information-based entry 311 is introduced by the ARP processor 112.

A-3. Processing Operations

Referring back to FIG. 1, a route introduction process performed by the route introducer 107 is explained. The routing table 103 included in each VRF 102 stores the packet destination IP address, the forwarding destination layer 3 interface, and the forwarding destination IP address. The route introduction process performed by the route introducer 107 generates an entry including the packet condition VRF 302 showing the number assigned to the VRF 102 having a certain route, the packet destination IP address 303 showing the packet destination IP address of the route, the forwarding destination layer 3 interface 305 showing the forwarding destination layer 3 interface of the route, the forwarding destination IP address 306 showing the forwarding destination IP address of the route, and the forwarding destination MAC address 307 taking the value representing the status 'unresolved'. The generated entry is then introduced into the forwarding table 123. The direct route does not have the forwarding destination IP address. The value representing 'direct linkage' is accordingly written in the forwarding destination IP address 306 of an entry that adopts a direct route.

The forwarding destination identification module 124 performs series of processing described below. The forwarding destination identification module 124 is designed to specify an adequate layer 3 interface 131 for each packet received from a layer 3 interface 131 and send the received packet from the specified layer 3 interface 131. According to a concrete procedure, in response to reception of a packet from a layer 3 interface 131, the forwarding destination identification module 124 searches the interface VRF table 122 with the layer 3 interface receiving the packet as a search key to specify a VRF receiving the packet (packet-receiving VRF). The forwarding destination identification module 124 subsequently searches the forwarding table 123 with the specified packet-receiving VRF and the packet destination IP address as search keys to specify a forwarding destination layer 3 interface and a forwarding destination MAC address. The forwarding destination identification module 124 then sends the packet from a layer 3 interface 131 appointed by the specified forwarding destination layer 3 interface to the specified forwarding destination MAC address. When the search result of a received packet in the forwarding table 123 shows an ARP-unresolved entry or an ARP-unsolvable entry having the forwarding destination MAC address equal to the value representing the status 'unresolved', the forwarding destination identification module 124 sends an 'unresolved' notification to the ARP processor 112. Simultaneously the forwarding destination identification module 124 notifies the ARP processor 112 of the forwarding destination layer 3 interface 305, the forwarding destination IP address 306, and the packet destination IP address 303 of the entry specified in the forwarding table 123.

When the search result of a received packet in the forwarding table 123 shows an ARP-resolved entry or an ARP packet, on the other hand, the forwarding destination identification module 124 sends an ARP packet receipt notification to the ARP processor 112. Simultaneously the forwarding destination identification module 124 notifies the ARP processor 112 of the received ARP packet and the layer 3 interface receiving the packet (hereafter may be referred to as 'packet-receiving layer 3 interface').

The ARP processor 112 performs series of processing as discussed below. In response to reception of the 'unresolved' notification from the forwarding destination identification module 124, the ARP processor 112 performs an ARP resolving process. The ARP resolving process sends an ARP request packet from the notified forwarding destination layer 3 interface to inquire the notified forwarding destination IP address. When the notified forwarding destination IP address is the value representing the status 'direct linkage', the ARP processor 112 inquires the notified packet destination IP address. For example, in response to reception of a packet, which is to be sent to an IP address '20.1.1.1', from the layer 3 interface assigned to the VRF:2 in the state of FIG. 3A, the forwarding destination identification module 124 searches the forwarding table 123 in the state of FIG. 3A to retrieve the entry 310 having the forwarding destination MAC address equal to the value representing the status 'unresolved'. The 'unresolved' notification is then sent to the ARP processor 112. According to the contents of the received 'unresolved' notification, the ARP processor 112 sends an ARP request packet to inquire the forwarding destination IP address '10.1.1.1' from the layer 3 interface: A.

In response to reception of the ARP packet receipt notification from the forwarding destination identification module 124, on the other hand, the ARP processor 112 performs an ARP learning process. The ARP learning process rewrites the forwarding destination of each condition-satisfying entry in the forwarding table 123 and introduces learnt ARP information into the forwarding table 123. The concrete procedure of the ARP learning process rewrites the forwarding destination MAC address 307 to a learnt MAC address for each of all the entries having the forwarding destination layer 3 interface 305 identical with packet-receiving layer 3 interface of the received ARP packet and the forwarding destination IP address 306 identical with a learnt IP address of the ARP packet in the forwarding table 123. The ARP learning process subsequently searches the interface VRF table 122 with the packet-receiving layer 3 interface of the ARP packet as a search key to specify a VRF. The learnt ARP information including the specified VRF as the packet condition VRF 302 is introduced into the forwarding table 123.

For example, in the state of FIG. 3A, it is assumed that an ARP packet having a MAC address 'R1' is received from a device having an IP address '10.1.1.1' of a layer 3 interface: A. In response to reception of the ARP packet receipt notification, the ARP learning process rewrites the forwarding destination MAC address 307 equal to the value representing the status 'unresolved' to the MAC address 'R1' for each of all the entries 309 and 310 having the forwarding destination layer 3 interface 305 equal to A and the forwarding destination IP address 306 equal to the IP address '10.1.1.1'. The ARP learning process subsequently searches the interface VRF table 122 with the layer 3 interface: A as a search key to specify the VRF: 1. The ARP learning process then generates the entry 311 having the VRF 302 equal to '1', the packet destination IP address 303 equal to '10.1.1.1/32', the forwarding destination layer 3 interface 305 equal to 'A', the forwarding destination IP address 306 equal to '10.1.1.1', and the forwarding destination MAC address 307 equal to 'R1' and introduces the generated entry 311 into the forwarding table 123.

Such introduction of the ARP information changes the contents of the forwarding table 123 to the state of FIG. 3B. Since all the entries 309 and 310 having the forwarding destination IP address '10.1.1.1.' of the layer 3 interface: A have the forwarding destination MAC address 'R1', a received packet having the packet-receiving VRF and the packet destination IP address that are identical with those of the entries 309 and 310 is transferable to the MAC address 'R1' of the layer 3 interface: A. Among packets corresponding to the entry 308 having the packet destination IP address '10.1.1.0/24' of the layer 3 interface: A by the direct route, only a packet that is to be sent to an IP address '10.1.1.1' of the VRF: 1 is transferable to the MAC address 'R1' of the layer 3 interface: A by utilizing the entry 311.

The ARP processor 112 also performs an ARP deletion process. The ARP deletion process follows the series of processing of the ARP learning process in a reverse order. The concrete procedure of the ARP deletion process rewrites the forwarding destination MAC address to the value representing the status 'unresolved' for each of all the entries having the forwarding destination layer 3 interface 305 and the forwarding destination IP address 306 identical with a layer 3 interface and an IP address of ARP information to be deleted. The ARP deletion process subsequently searches the interface VRF table 122 with the layer 3 interface of the ARP information to be deleted as a search key to specify a VRF. The ARP deletion process then searches the forwarding table 123 with the specified VRF and the IP address of the ARP information to be deleted as search keys to retrieve any condition-satisfying entry, and deletes the retrieved entry from the forwarding table 123.

For example, it is assumed that the ARP information showing the MAC address 'R1' for the device having the IP address '10.1.1.1' of the layer 3 interface: A is to be deleted from the forwarding table 123 in the state of FIG. 3B. The ARP deletion process first rewrites the forwarding destination MAC address 307 to the value representing the status 'unresolved' for each of all the entries 309 and 310 having the forwarding destination layer 3 interface 305 equal to 'A' and the forwarding destination IP address 306 equal to '10.1.1.1'. The ARP deletion process subsequently searches the interface VRF table with the layer 3 interface: A as a search key to specify the VRF: 1. The ARP deletion process then searches the forwarding table 123 with the specified VRF: 1 and the IP address '10.1.1.1' as search keys to retrieve the condition-satisfying entry 311 and deletes the retrieved entry 311 from the forwarding table 123.

Such deletion of the ARP information changes the contents of the forwarding table 123 to the state of FIG. 3A. Since all the entries 309 and 310 having the forwarding destination IP address '10.1.1.1.' of the layer 3 interface: A have the forwarding destination MAC address equal to the value representing the status 'unresolved', a received packet having the packet-receiving VRF and the packet destination IP address that are identical with those of the entries 309 and 310 is non-transferable by deletion of the ARP information. Deletion of the entry 311 causes a packet that is to be sent to an IP address '10.1.1.1' of the VRF: 1 to correspond to the entry 308 having the packet destination IP address '10.1.1.0/24' of the layer 3 interface: A by the direct route and to be non-transferable.

B. First Embodiment

An inter-VRF forwarding apparatus is described below as a first embodiment of the invention.

B-1. System Configuration (FIG. 4)

Figure 4:
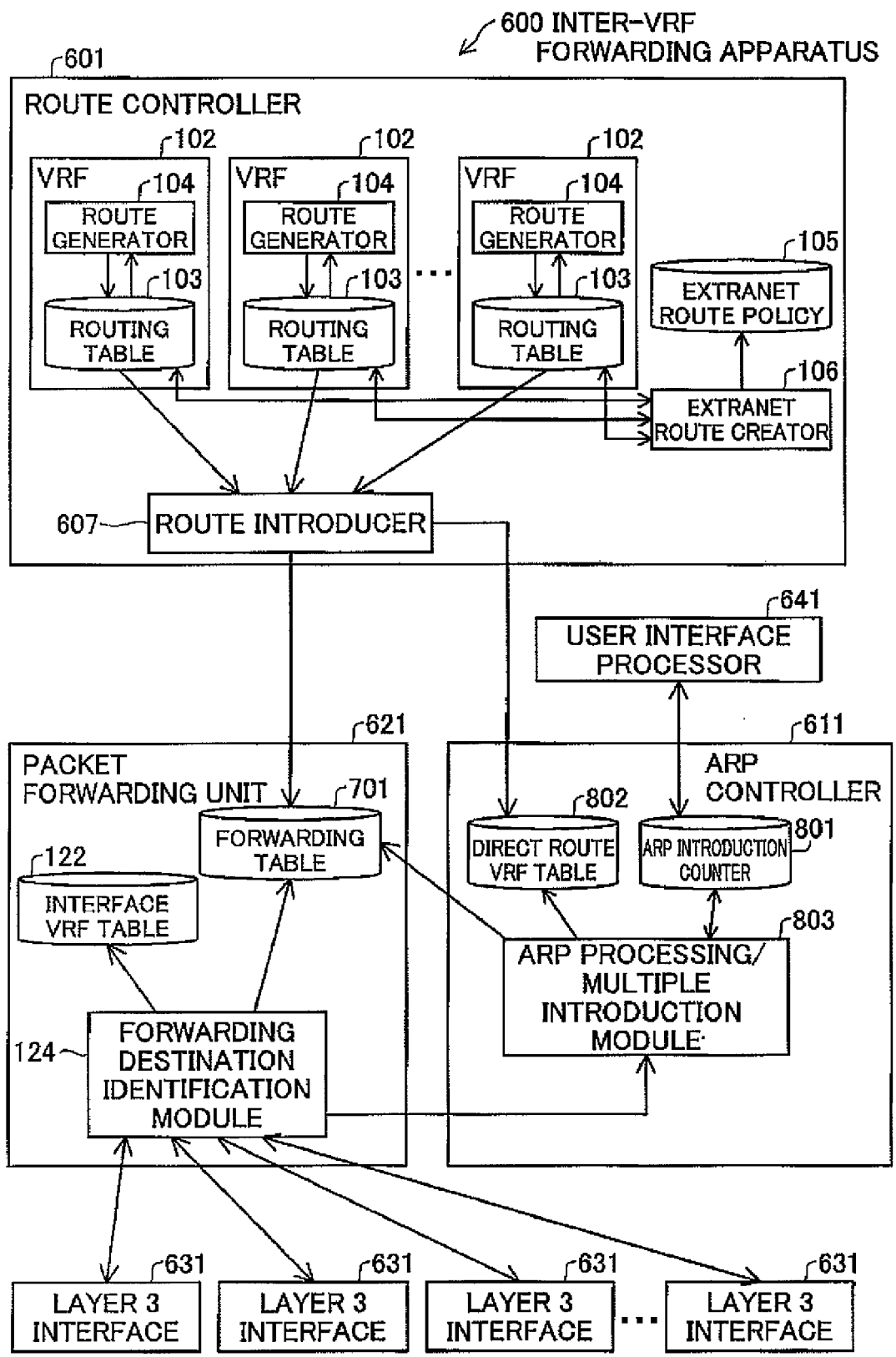
FIG. 4 is a block diagram schematically illustrating the general configuration of an inter-VRF forwarding apparatus in a first embodiment of the invention.

FIG. 4 schematically illustrates the general configuration of an inter-VRF forwarding apparatus 600 in the first embodiment of the invention. The inter-VRF forwarding apparatus 600 includes a route controller 601, an ARP controller 611, a packet forwarding unit 621, multiple layer 3 interfaces 631, and a user interface processor 641. According to the comparison between the inter-VRF forwarding apparatus 600 of the embodiment and the inter-VRF forwarding apparatus 100 of the reference example (see FIG. 1), the inter-VRF forwarding apparatus 600 of the embodiment includes the similar units to those of the inter-VRF forwarding apparatus 100 of the reference example except the presence of the user interface processor 641. The common structures and the differences of the respective units between the inter-VRF forwarding apparatus 600 and the inter-VRF forwarding apparatus 100 are explained below.

A route introducer 607 of the route controller 601 is connected with the ARP controller 611 in the inter-VRF forwarding apparatus 600 of the embodiment, while the route introducer 107 of the route controller 101 is not connected with the ARP controller 111 in the inter-VRF forwarding apparatus 100 of the reference example. Namely the series of processing performed by the route introducer 607 of the route controller 601 is different from the series of processing performed by the route introducer 107 of the route controller 101. The constituents of the route controller 601 other than the route introducer 607 are similar to those of the route controller 101 of the reference example and are expressed by the like numerals.

The ARP controller 611 in the inter-VRF forwarding apparatus 600 of the embodiment has an ARP introduction counter 801, a direct route VRF table 802, and an ARP processing/multiple introduction module 803, while the ARP controller 111 in the inter-VRF forwarding apparatus 100 of the reference example has only the ARP processor 112 as explained above.

In the ARP controller 611, the ARP processing/multiple introduction module 803 is connected with the ARP introduction counter 801 and with the direct route VRF table 802. The ARP processing/multiple introduction module 803 is also connected with a forwarding table 701 and with a forwarding destination identification module 124 included in the packet forwarding unit 621. In the configuration of the reference example discussed above, the ARP processor 112 is connected with the interface VRF table 122, as well as with the forwarding table 123 and the forwarding destination identification module 124, in the packet forwarding unit 121. The ARP processing/multiple introduction module 803 of the embodiment, however, has no such connection with an interface VRF table 122 in the packet forwarding unit 621. The ARP processing/multiple introduction module 803 of the embodiment is equivalent to the 'address resolving module' of the invention.

Like the packet forwarding unit 121 in the inter-VRF forwarding apparatus 100 of the reference example, the packet forwarding unit 621 in the inter-VRF forwarding apparatus 600 of the embodiment includes the forwarding table 701, the interface VRF table 122, and the forwarding destination identification module 124. The forwarding table 701 in the packet forwarding unit 621 of the embodiment has the data structure different from that of the forwarding table 123 in the packet forwarding apparatus 121 of the reference example. The data structure of the forwarding table 701 will be discussed later.

The multiple layer 3 interfaces 631 in the inter-VRF forwarding apparatus 600 of the embodiment are identical with the multiple layer 3 interfaces 131 in the inter-VRF forwarding apparatus 100 of the reference example.

The inter-VRF forwarding apparatus 600 of the embodiment has the user interface processor 641, which is not included in the inter-VRF forwarding apparatus 100 of the reference example. The user interface processor 641 is connected with a terminal device operated by a system administrator and is designed to interpret the administrator's command or instruction received from the terminal device and to send back the processing result of the command or instruction to the terminal device. The user interface processor 641 is connected with the ARP introduction counter 801 of the ARP controller 611.

Figure 7:
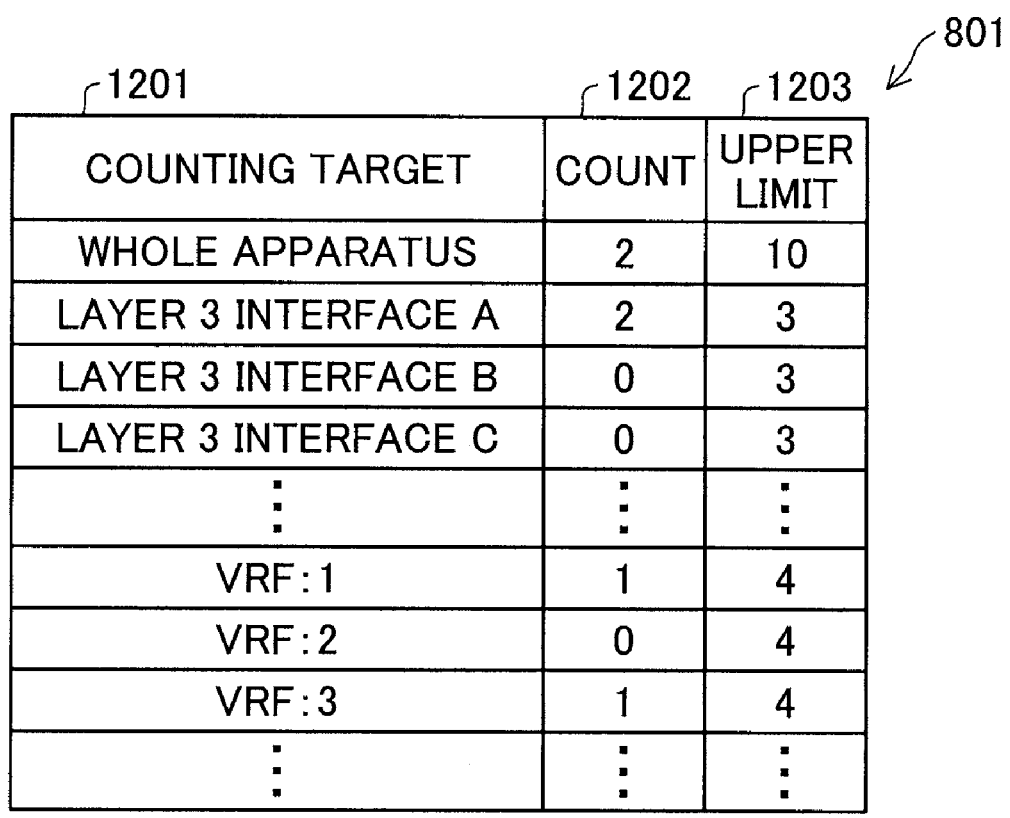
FIG. 7 is an explanatory view showing one example of the structure of an ARP introduction counter in the first embodiment.

B-2. Structures of Tables (FIGS. 5-7)

FIG. 5 shows one example of the data structure of the forwarding table 701 in the packet forwarding unit 621. The forwarding table 701 stores a packet condition of each received packet in correlation to a forwarding destination. The route introducer 607 (see FIG. 4) introduces route-based entries, while the ARP processing/multiple introduction module 803 (see FIG. 4) introduces ARP information-based entries. Each entry of the forwarding table 701 includes a type 708 representing an introduction basis of the entry, in addition to a VRF 302 and a packet destination IP address 303 as items of a packet condition 301 and a forwarding destination layer 3 interface 305, a forwarding destination IP address 306, and a forwarding destination MAC address 307 as items of a forwarding destination 304, which are also included in each entry of the forwarding table 123 of the reference example. Namely the forwarding table 701 of the embodiment has the similar data structure to that of the forwarding table 123 of the reference example, except the type 708.

Each entry introduced by the route introducer 607 has a registration 'route' for the type 708, while each entry introduced by the ARP processing/multiple introduction module 803 has a registration 'ARP' for the type 708. The entry adopting a direct route or an extranet direct route uses the packet destination IP address of a packet as a forwarding destination of the packet. The forwarding destination IP address of the entry is accordingly not determined. In order to explain the 'undetermined' IP address, the forwarding destination IP address 306 may take a value representing a status 'direct linkage', in addition to actual IP addresses. The forwarding destination MAC address 307 may take a value representing a status 'unresolved', in addition to actual MAC addresses. This status 'unresolved' means an ARP-unresolved entry without specification of the forwarding destination MAC address 307 or an ARP-unsolvable entry adopting a direct route or an extranet direct route.

FIG. 6 shows one example of the data structure of the direct route VRF table 802. The direct route VRF table 802 records a correlation of the forwarding destination layer 3 interface to the packet destination IP address and the route-introducing VRF with regard to each entry adopting a direct route or an extranet direct route written in the forwarding table 701. Namely the direct route VRF table 802 stores a correlation of learnt ARP information for the forwarding destination layer 3 interface and the packet destination IP address to the packet condition VRF that is to be introduced into the forwarding table 701. Each entry has a VRF list 1103 in correlation to a layer 3 interface 1101 and an IP address 1102. The VRF list 1103 of each entry may include multiple VRF identifiers.

FIG. 7 shows one example of the structure of an ARP introduction counter 801. The ARP introduction counter 801 is constructed as a table recording the count and the upper limit of forwarding table entries introduced by the ARP processing/multiple introduction module 803 with regard to each specified condition given as a counting target, such as the whole apparatus, each individual of the layer 3 interfaces, or each individual of the VRFs. Namely each entry includes a counting target 1201 as a specified condition, a count 1202 or the number of each entry satisfying the specified condition, and an upper limit 1203 of the entry. A predetermined numerical value is registered as the upper limit 1203.

B-3. Processing Operations (FIGS. 8-11)

Referring back to FIG. 4, a route introduction process performed by the route introducer 607 of the embodiment is explained below. The route introducer 607 obtains a route adopted for a packet from the routing table 103 of each VRF 102 and introduces the obtained route into the forwarding table 701. When the introduced route is either a direct route or an extranet direct route, the route introducer 607 writes the introduced route into the direct route VRF table 802. An entry including the forwarding destination layer 3 interface of the introduced route, the packet destination IP address, and the identifier of the VRF 102 including the routing table 103 recording the route is written into the direct route VRF table 802. When there is an existing entry for the forwarding destination layer 3 interface and the packet destination IP address of the introduced route in the direct route VRF table 802, the corresponding VRF identifier is added to the VRF list 1103 (see FIG. 6) for the existing entry. As the result of the route introduction process, a set of VRF identifiers for each entry adopting the direct route or the extranet direct route is recorded in the direct route VRF table 802.

The forwarding destination identification module 124 of the embodiment performs series of processing that are similar to the series of processing performed by the forwarding destination identification module 124 of the reference example described previously. The notification destination by the forwarding destination identification module 124 is the ARP processing/multiple introduction module 803 in the embodiment, while the notification destination is the ARP processor 112 in the reference example.

The ARP processing/multiple introduction module 803 of the embodiment performs series of processing as discussed below. The ARP processing/multiple introduction module 803 of the embodiment performs an ARP resolving process, an ARP learning process, and an ARP deletion process, like the ARP processor 112 of the reference example. In response to reception of an 'unresolved' notification from the forwarding destination identification module 124, the ARP processing/multiple introduction module 803 performs the ARP resolving process. The ARP resolving process sends an ARP request packet from the notified forwarding destination layer 3 interface to inquire the notified forwarding destination IP address. When the notified forwarding destination IP address is the value representing the status 'direct linkage', the ARP processing/multiple introduction module 803 inquires the notified packet destination IP address.

In response to reception of an ARP packet receipt notification from the forwarding destination identification module 124, the ARP processing/multiple introduction module 803 performs the ARP learning process as described in detail below.

Figure 8:
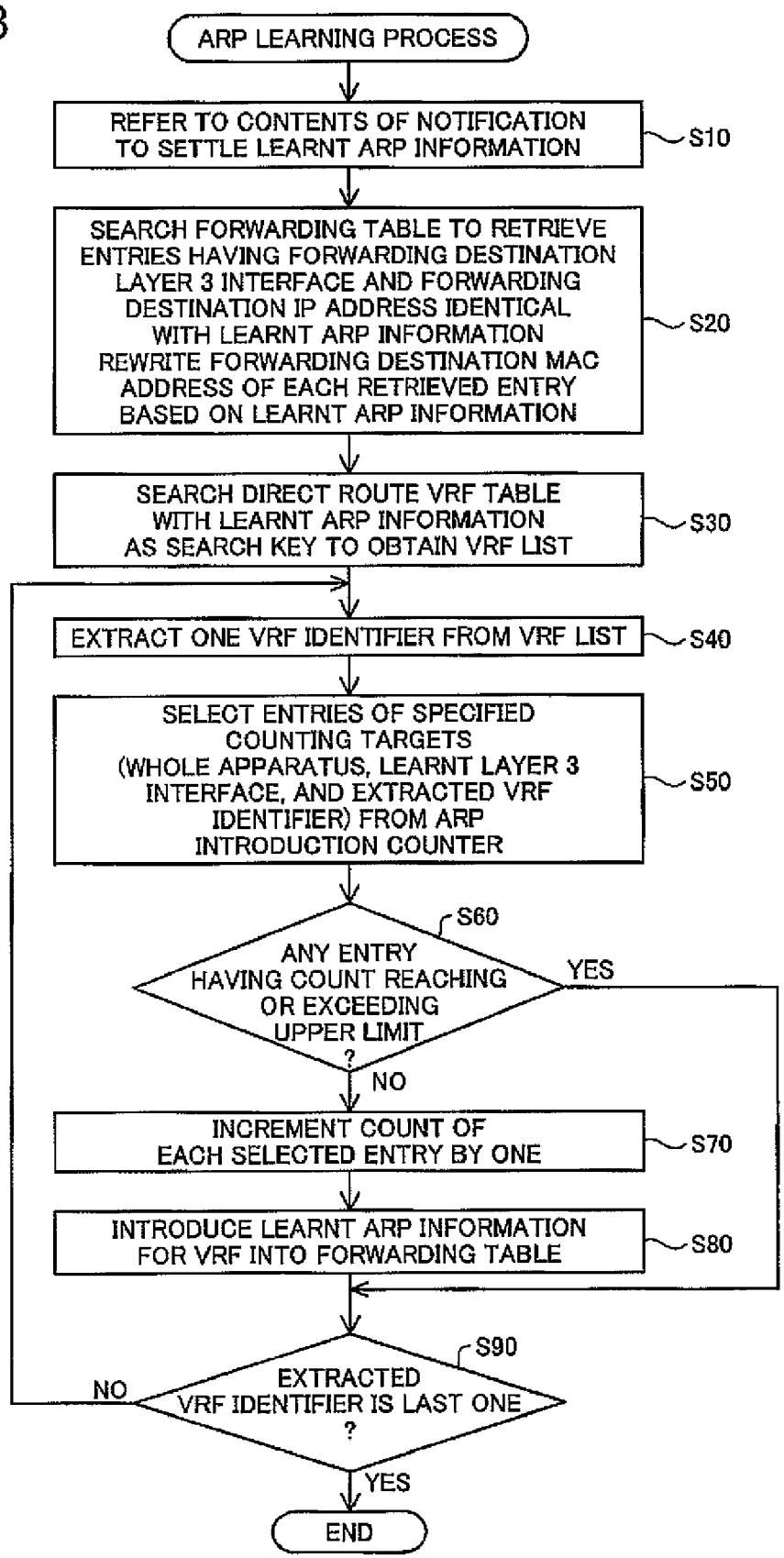
FIG. 8 is a flowchart showing a procedure of ARP learning process performed by an ARP processing/multiple introduction module in the first embodiment.

FIG. 8 is a flowchart showing a procedure of the ARP learning process performed by the ARP processing/multiple introduction module 803, which is actualized by a CPU of the inter-VRF forwarding apparatus 600 of the embodiment. The CPU first refers to the contents of a notification of a received ARP packet and a packet-receiving layer 3 interface to settle a learnt layer 3 interface, a learnt IP address, and a learnt MAC address (hereafter may be collectively referred to as 'learnt ARP information') (step S10). The CPU subsequently searches the forwarding table 701 to retrieve all the entries having the forwarding destination layer 3 interface 305 and the forwarding destination IP address 306 that are identical with the learnt layer 3 interface and the learnt IP address settled at step S10, and rewrites the forwarding destination MAC address of each retrieved entry to the learnt MAC address (step S20).

The learnt ARP information is then introduced into the forwarding table 701. According to a concrete procedure, the CPU searches the direct route VRF table 802 (see FIG. 6) to retrieve all the entries having the layer 3 interface 1101 and the IP address 1102 that are identical with the learnt layer 3 interface and the learnt IP address settled at step S10, and obtains a VRF list of the retrieved entries (step S30). The VRF list may include one or multiple VRF identifiers. The CPU extracts one VRF identifier out of the VRF list obtained at step S30 (step S40).

The CPU then reads the ARP introduction counter 801 to select the entry having the counting target 1201 'whole apparatus', the entry having the counting target 1201 identical with the learnt layer 3 interface settled at step S10, and the entry having the counting target 1201 identical with the VRF identifier extracted at step S40 (step S50). One or multiple entries or even no entry may be selected here. The CPU subsequently compares the count 1202 or the number of each entry selected at step S50 with its upper limit 1203 and thereby determines whether there is any entry having its count reaching or exceeding its upper limit among the selected entries (step S60). Upon determination at step S60 that there is any entry having its count reaching or exceeding its upper limit, the processing flow skips the processing of steps S70 and S80 and proceeds to step S90.

Upon determination at step S60 that there is no entry having its count reaching or exceeding its upper limit and that all the entries have their counts less than their upper limits, on the other hand, the CPU proceeds to step S70 to increment the count 1202 or the number of each entry selected at step S50 by one. After the increment at step S70, the CPU introduces an entry including the VRF specified by the VRF identifier extracted at step S40 as the packet condition VRF 302, the learnt IP address settled at step S10 as the packet destination IP address 303, the learnt ARP information (learnt layer 3 interface, learnt IP address, and learnt MAC address) settled at step S10 as the forwarding destination 304, and ARP as the type 708 into the forwarding table 701 (step S80). The processing flow then goes to step S90.

At step S90, the CPU determines whether the VRF identifier extracted from the VRF list at step S40 is the last one. Upon determination at step S90 that the extracted VRF identifier is not the last one, the processing flow returns to step S40 to extract a next VRF identifier and repeats the processing of steps S50 through S90 with regard to the newly extracted VRF identifier. Upon determination at step S90 that the extracted VRF identifier is the last one, on the other hand, the CPU terminates this ARP learning process.

The direct route VRF table 802 (FIG. 4) stores all the VRFs of direct routes and extranet direct routes introduced by the layer 3 interface and the IP address in the forwarding table 701. The ARP learning process of FIG. 8 obtains all the VRFs requiring the learnt ARP information from the direct route VRF table 802 (step S30) and introduces the learnt ARP information for each VRF into the forwarding table 701 (step S80).

Prior to the introduction of the learnt ARP information for each VRF, the ARP learning process of FIG. 8 increments the count 1202 or the number of each entry having the same counting target 1201 as the ARP information by one in the ARP introduction counter 801 (step S70). This ensures management of the counts of forwarding table entries with regard to the respective counting targets 1201, such as the whole apparatus, the individual layer 3 interfaces, and the individual VRFs, introduced by the ARP processing/multiple introduction module 803. Correct values representing the counts of forwarding table entries introduced by the ARP processing/multiple introduction module 803 can thus be presented in response to a request from the user interface processor 641. The ARP learning process of FIG. 8 confirms that the count 1202 or the number of each entry having the same counting target 1201 as the ARP information is less than its upper limit 1203 in the ARP introduction counter 801 and cancels the introduction of the ARP information for each VRF if the count reaches or exceeds its upper limit (steps S60 through 90). This series of processing assures that the counts of forwarding table entries with regard to the respective counting targets 1201, such as the whole apparatus, the individual layer 3 interfaces, and the individual VRFs, introduced by the ARP processing/multiple introduction module 803 do not exceed the respective upper limits set by the user interface processor 641. This facilitates resource management of the inter-VRF forwarding apparatus 600.

Figure 9:
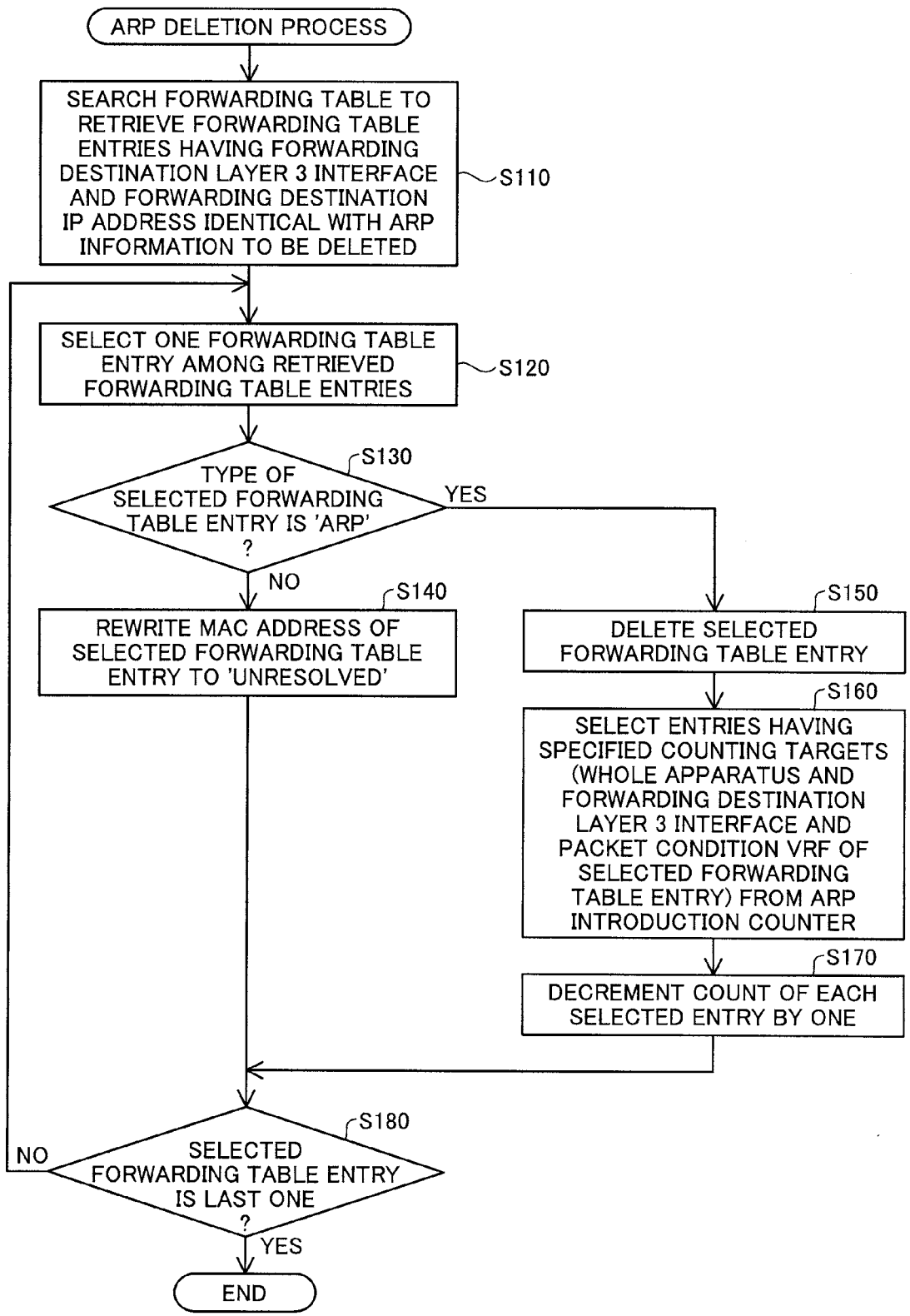
FIG. 9 is a flowchart showing a procedure of ARP deletion process performed by the ARP processing/multiple introduction module in the first embodiment.

FIG. 9 is a flowchart showing a procedure of the ARP deletion process performed by the ARP processing/multiple introduction module 803, which is actualized by a CPU of the inter-VRF forwarding apparatus 600 of the embodiment. The CPU first searches the forwarding table 701 to retrieve all the entries (forwarding table entries) having the forwarding destination layer 3 interface 305 and the forwarding destination IP address 306 that are identical with the layer 3 interface and the IP address of the ARP information to be deleted (step S110). One or multiple forwarding table entries or even no forwarding table entry may satisfy the condition.

The CPU subsequently selects one forwarding table entry among the forwarding table entries retrieved by the search at step S110 (step S120). The CPU then identifies whether the type 708 of the forwarding table entry selected at step S120 is 'ARP' (step S130). Upon identification at step S130 that the type 708 of the selected forwarding table entry is not 'ARP' but 'route', the CPU rewrites the forwarding destination MAC address 307 of the forwarding table entry selected at step S120 to the value representing the status 'unresolved' (step S140) and proceeds to step S180.

Upon identification at step S130 that the type 708 of the selected forwarding table entry is 'ARP', on the other hand, the CPU deletes the forwarding table entry selected at step S120 from the forwarding table 701 (step S150). The CPU then reads the ARP introduction counter 801 to select the entry having the counting target 1201 'whole apparatus', the entry having the counting target 1201 identical with the forwarding destination layer 3 interface of the forwarding table entry selected at step S120, and the entry having the counting target 1201 identical with the packet condition VRF of the forwarding table entry selected at step S120 (step S160). The CPU decrements the count 1202 or the number of each entry selected at step S160 by one (step S170) and proceeds to step S180.

At step S180, the CPU determines whether the forwarding table entry selected among the forwarding table entries retrieved by the search of the forwarding table 701 at step S120 is the last one. Upon determination at step S180 that the selected forwarding table entry is not the last one, the processing flow returns to step S120 to select a next forwarding table entry and repeats the processing of steps S130 through S180 with regard to the newly selected forwarding table entry. Upon determination at step S180 that the selected forwarding table entry is the last one, on the other hand, the CPU terminates this ARP deletion process.

In the case of introduction of multiple forwarding table entries from the same ARP information by the ARP learning process of FIG. 8, all these forwarding table entries have the forwarding destination layer 3 interface 305 and the forwarding destination IP address 306 identical with the ARP information and satisfy the type 708 'ARP'. The ARP deletion process of FIG. 9 deletes all these forwarding table entries introduced according to the ARP information with rewriting the forward destination MAC address of the route.

Simultaneously with deletion of the forwarding table entry having the type 708 'ARP', the ARP deletion process of FIG. 9 decrements the count 1202 or the number of each entry having the same counting target 1201 as the deleted forwarding table entry by one in the ARP introduction counter 801 (step S170). Correct values representing the counts of forwarding table entries introduced by the ARP processing/multiple introduction module 803 can thus be presented in response to a request from the user interface processor 641.

Figure 10:
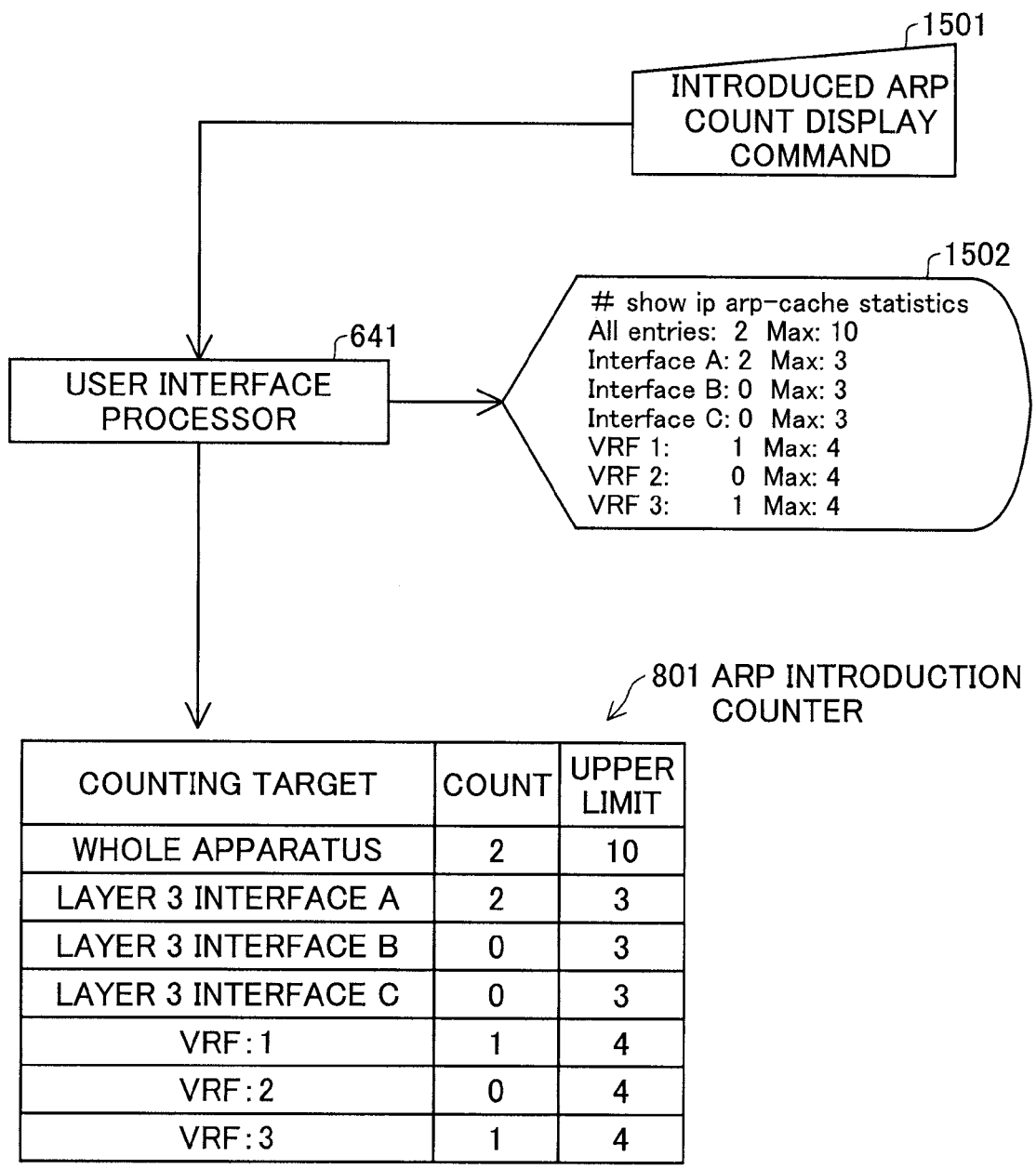
FIG. 10 is an explanatory view showing one processing flow performed by a user interface processor in the first embodiment.

The user interface processor 641 performs series of processing described below in detail. FIG. 10 shows one processing flow performed by the user interface processor 641. This processing flow is activated when the system administrator issues an introduced ARP count display command 1501 to obtain the counts of forwarding table entries having the type 'ARP'. In response to reception of the introduced ARP count display command 1501 sent from a terminal device (not shown) operated by the system administrator, the user interface processor 641 reads the ARP introduction counter 801 to select the forwarding table entries satisfying the condition specified by the introduced ARP count display command 1501 and sends back the counting target 1201, the count 1202, and the upper limit 1203 of each selected forwarding table entry (see FIG. 7) to a display 1502 of the terminal device. The counts and the upper limits of the respective forwarding table entries with the type 'ARP' corresponding to the respective counting targets are thus shown on the display 1502.

The above series of processing performed by the user interface processor 641 notifies the system administrator of the counts of the respective forwarding table entries with the type 'ARP' corresponding to the respective counting targets, such as the whole apparatus, the individual layer 3 interfaces, and the individual VRFs.

Figure 11:
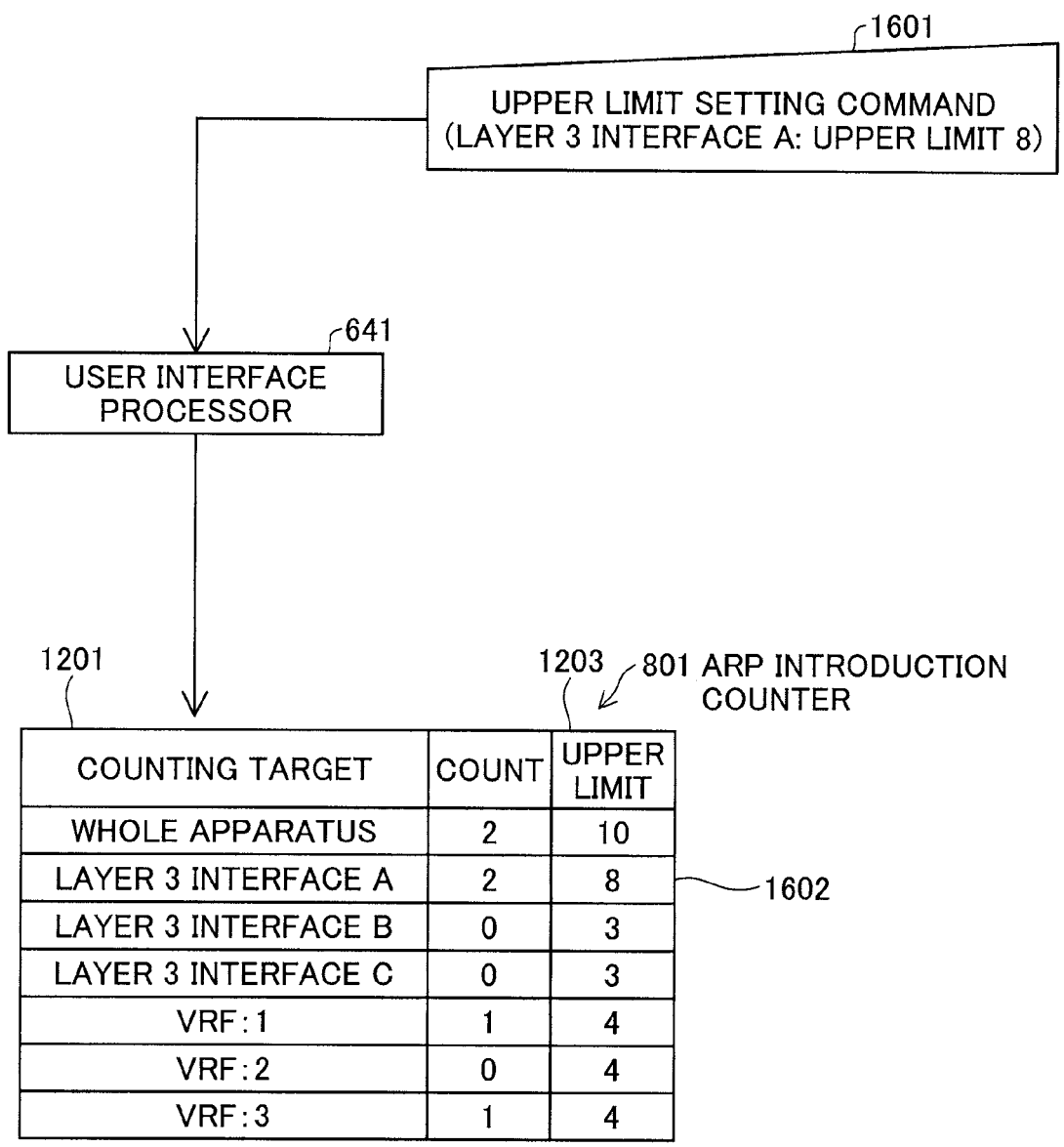
FIG. 11 is an explanatory view showing another processing flow performed by the user interface processor in the first embodiment.

FIG. 11 shows another processing flow performed by the user interface processor 641. This processing flow is activated when the system administrator issues an upper limit setting command 1601 to set an upper limit of a specified forwarding table entry having the type 'ARP'. In response to reception of the upper limit setting command 1601 sent from a terminal device (not shown) operated by the system administrator, the user interface processor 641 rewrites the upper limit of a specified forwarding table entry in the ARP introduction counter 801 according to the received upper limit setting command 1601. In the illustrated example, the upper limit setting command 1601 specifies a value '8' as the upper limit of the layer 3 interface A. The user interface processor 641 reads the ARP introduction counter 801 to select the entry having the counting object 1201 'layer 3 interface A' and rewrites the upper limit 1203 of the selected entry (entry 1602) to the value '8' specified by the upper limit setting command 1601.

The above series of processing performed by the user interface processor 641 enables the system administrator to set the upper limits of the forwarding table entries with the type 'ARP' for the respective counting targets, such as the whole apparatus, the individual layer 3 interfaces, and the individual VRFs.

B-4. Functions and Effects

B-4-1. Drawbacks of Reference Example (FIGS. 12-15)

Prior to description of the functions and the effects of the first embodiment, the drawbacks of the reference example are discussed below.

Figure 12:
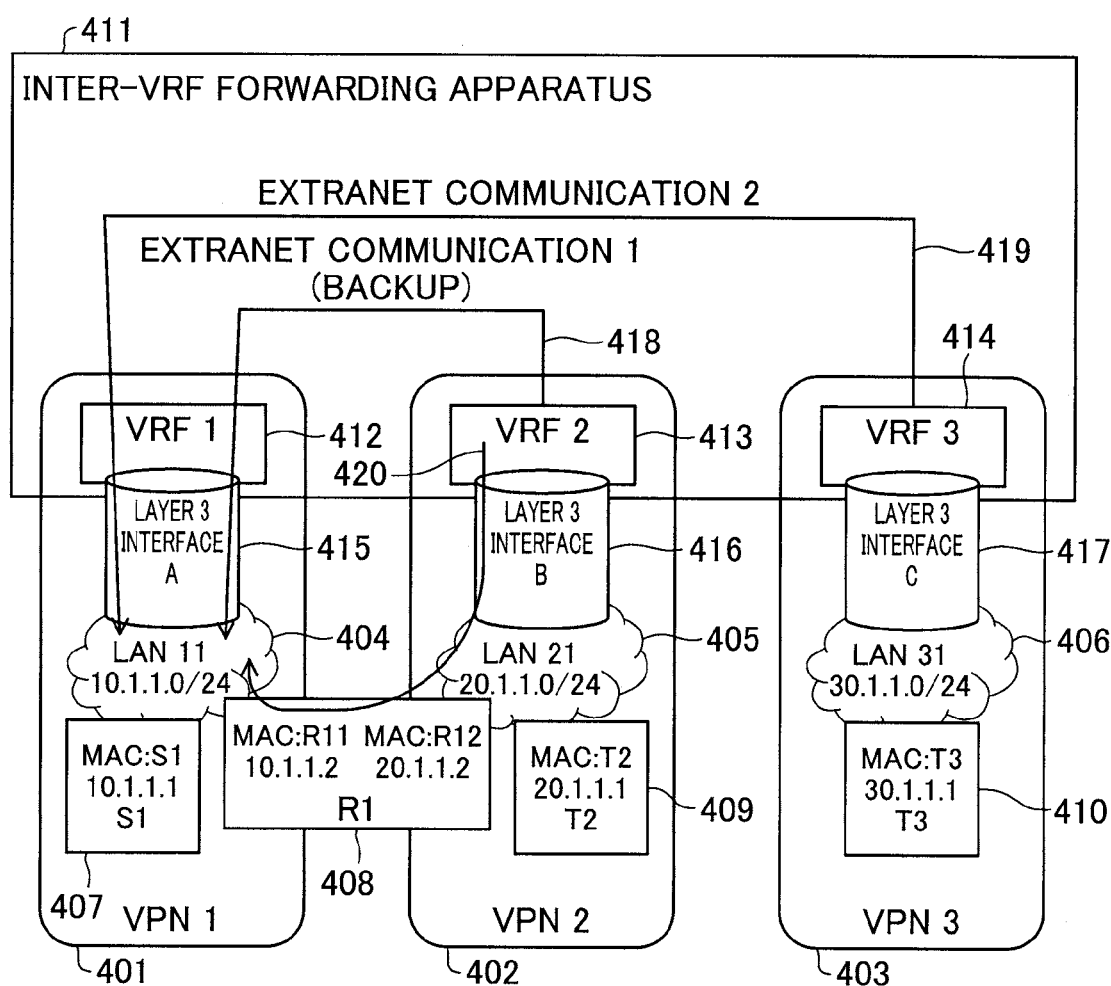
FIG. 12 is an explanatory view showing a VPN network adopting the configuration of the reference example.

FIG. 12 shows a VPN network adopting the configuration of the reference example. As shown in FIG. 12, the VPN network includes three VPNs, VPN1 (401), VPN2 (402), and VPN3 (403). When there are multiple identical components, these components are discriminated from one another by adding adequate postscripts, such as '1', '2', and '3', to a common component name. For the purpose of differentiation between the subscripts and the numerals assigned to the respective components to be used in the drawings, the numerals used in the drawings are given in parentheses.

The VPN1 (401) includes a LAN11 (local area network) (404), and a server S1 (407) and a router R1 (408) are located on the LAN11 (404). The VPN2 (402) includes a LAN21 (405), and a terminal device T2 (409) and the router R1 (408) are located on the LAN21 (405). The VPN3 (403) includes a LAN31 (406), and a terminal device T3 (410) is located on the LAN31 (406). The router R1 (408) connects the LAN11 (404) of the VPN1 (401) with the LAN21 (405) of the VPN2 (402) and has a route leading to the LAN11 (404) and a route leading to the LAN21 (405) to forward packets addressed to the LAN11 (404) and packets addressed to the LAN21 (405).

An inter-VRF forwarding apparatus 411 is located on the network to cover all the three VPNs, VPN1 (401), VPN2 (402), and VPN3 (403). In the description hereafter, the inter-VRF forwarding apparatus 100 of the reference example discussed above is adopted for the inter-VRF forwarding apparatus 411. A VRF1 (412) is allocated to the VPN1 (401), and a layer 3 interface A (415) for the LAN11 (404) is assigned to the VRF1 (412). Similarly a VRF2 (413) is allocated to the VPN2 (402), and a layer 3 interface B (416) for the LAN21 (405) is assigned to the VRF2 (413). A VRF3 (414) is allocated to the VPN3 (403), and a layer 3 interface C (417) for the LAN31 (406) is assigned to the VRF3 (414).

The inter-VRF forwarding apparatus 411 performs layer 3 forwarding within each of the VRFs, VRF1 (412), VRF2 (413), and VRF3 (414), while making extranet communication 1 (418) from the VRF2 (413) to the subnet LAN11 (404) and extranet communication 2 (419) from the VRF3 (414) to the subnet LAN11 (404) with the server S1 (407) located thereon. A communication route 420 from the VRF2 (413) to the LAN11 (404) via the router R1 (408) has preference over the extranet communication 1 (418) from the VRF2 (413) to the LAN11 (404). The extranet communication 1 (418) from the VRF2 (413) to the LAN11 (404) via the inter-VRF forwarding apparatus 411 is accordingly a backup route that is activated in the case of some failure or trouble occurring in the router R1 (408) or in the LAN21 (405).

In the illustrated example of FIG. 12, the inter-VRF forwarding apparatus 411 has the three VRFs, and one layer 3 interface is located in each VRF. The drawbacks or problems of the reference example discussed below are similarly found in the configuration of the inter-VRF forwarding apparatus having any different number of VRFs and any different number of layer 3 interfaces per VRF.

FIG. 13A-13C show the contents of routing tables provided in the respective VRFs in the VPN network of FIG. 12. FIG. 13A, FIG. 13B, and FIG. 13C respectively show a routing table 501 provided in the VRF1 (412), a routing table 502 provided in the VRF2 (413), and a routing table 503 provided in the VRF3 (414).

As shown in FIG. 13A, the routing table 501 provided in the VRF1 (412) includes a direct route 504 for forwarding data having addressed to 10.1.1.0/24 of the LAN11 (404) to the layer 3 interface A (415). As shown in FIG. 13B, the routing table 502 provided in the VRF2 (413) includes a direct route 505 for forwarding data addressed to 20.1.1.0/24 of the LAN21 (405) to the layer 3 interface B (416), as well as a route 506 for changing the destination of data from an address 10.1.1.0/24 of the LAN11 (404) to an address 20.1.1.2 of the router R1 (408) of the layer 3 interface B (416) and an extranet direct route 507 of the extranet communication 1 (418) as a copy of the direct route 504 to the address 10.1.1.0/24 of the LAN11 (404) in the routing table (501) of the VRF1 (412).

As mentioned previously, the communication route 420 from the VRF2 (413) to the LAN11 (404) via the router R1 (408) has preference over the extranet communication 1 (418) from the VRF2 (413) to the LAN11 (404). A smaller priority number is accordingly given to the route 506 via the router R1 (408) than the extranet direct route 507 of the extranet communication 1 (418). The smaller priority number represents the higher priority. The route 506 via the router R1 (408) is thus adopted (expressed by an open circle in the drawing), while the extranet direct route 507 of the extranet communication 1 (418) is not adopted (expressed by a cross in the drawing).

As shown in FIG. 13C, the routing table 503 provided in the VRF3 (414) includes a direct route 508 for forwarding data addressed to 30.1.1.0/24 of the LAN31 (406) to the layer 3 interface C (417), as well as an extranet direct route 509 of the extranet communication 2 (419) as a copy of the direct route 504 to the address 10.1.1.0/24 of the LAN11 (404) in the routing table (501) of the VRF1 (412).

The contents of the forwarding table 123 (see FIG. 1) after introduction of the routes shown in FIG. 13 by the route introducer 107 (see FIG. 1) are described with reference to FIG. 14. The adopted routes (routes with the open circles in the 'Adopted' column) in the respective routing tables 501, 502, and 503 shown in FIG. 13 are all introduced into the forwarding table 123 shown in FIG. 14. In the forwarding table 123 of FIG. 14, an entry 601 is introduced from the direct route 504 in the routing table 501 provided in the VRF1 (412) shown in FIG. 13A. This entry 601 corresponds to a direct route of the VRF1 (412) to the LAN11 (404) in the VPN network of FIG. 12. In the forwarding table 123 of FIG. 14, an entry 602 is introduced from the extranet direct route 509 in the routing table 503 provided in the VRF3 (414) shown in FIG. 13C. This entry 602 corresponds to the extranet communication 2 (419) in the VPN network of FIG. 12.

The ARP learning process is activated in response to reception of an ARP packet from the server S1 (407). In the state of the forwarding table 123 shown in FIG. 14, when the inter-VRF forwarding apparatus 411 receives an ARP packet from the server S1 (407) at the layer 3 interface A (415), the ARP processor 112 settles the learnt layer 3 interface: A, the learnt IP address: 10.1.1.1, and the learnt MAC address: S1, rewrites the forwarding destination MAC address of an entry having the identical forwarding destination in the forwarding table 123, and introduces the learnt ARP information.

The concrete procedure of the ARP learning process searches the forwarding table 123 to retrieve any entry having the forwarding destination layer 3 interface and the forwarding destination IP address identical with the learnt layer 3 interface and the learnt IP address and rewrites the forwarding destination MAC address of each retrieved entry to the learnt MAC address. In the forwarding table 123 of FIG. 14, there is no entry satisfying the condition. Namely no entry in the forwarding table 123 is the object of rewriting the forwarding destination MAC address. The learnt ARP information is then introduced into the forwarding table 123. The concrete procedure of the ARP learning process searches the interface VRF table 122 to specify the VRF assigned to the learnt layer 3 interface. Since the learnt layer 3 interface A (415) is assigned to the VRF1 (412), the specified VRF is the VRF1 (412). The ARP information including the specified VRF for the learnt layer 3 interface as the packet condition VRF, the learnt IP address as the packet destination IP address, the learnt layer 3 interface as the forwarding destination layer 3 interface, the learnt IP address as the forwarding destination IP address, and the learnt MAC address as the forwarding destination MAC address is introduced into the forwarding table 123.

FIG. 15 shows the contents of the forwarding table 123 after insertion of the ARP information. An entry 701 is a forwarding table entry introduced according to the ARP information of the server S1 (407).

In the state of the forwarding table 123 shown in FIG. 15, in response to reception of a packet addressed to 10.1.1.1 from the layer 3 interface C (417) assigned to the VRF3 (414), the inter-VRF forwarding apparatus 411 searches the forwarding table 123 with the VRF3 (414) and the address 10.1.1.1 as search keys and obtains the value representing the status 'unresolved' as the forwarding destination MAC address according to the entry 602 based on the extranet direct route 509 for the VRF3 (414). Namely the received packet is non-transferable. The extranet direct route 509 in the routing table 503 provided for the VRF3 (414) (FIG. 13C) is related to the extranet communication 2 (419) from the VRF3 (414) to the LAN11 (404) (FIG. 12). The entry 602 in the forwarding table 123 (FIG. 15) is based on this extranet direct route 509. Although the ARP information of the server S1 (407) has been learnt, the received packet addressed to 10.1.1.1 is non-transferable.

As described above with reference to FIGS. 12 through 15, the configuration of the reference example does not allow communication by the layer 2-layer 3-integrated forwarding table in consideration of communication by the extranet direct route.

B-4-2. Functions and Effects of First Embodiment (FIGS. 16 & 17)

The inter-VRF forwarding apparatus 600 of the first embodiment discussed above is applied to the VPN network of FIG. 12. In the description hereafter, the inter-VRF forwarding apparatus 600 of the first embodiment is adopted for the inter-VRF forwarding apparatus 411 shown in FIG. 12.

Figure 16:
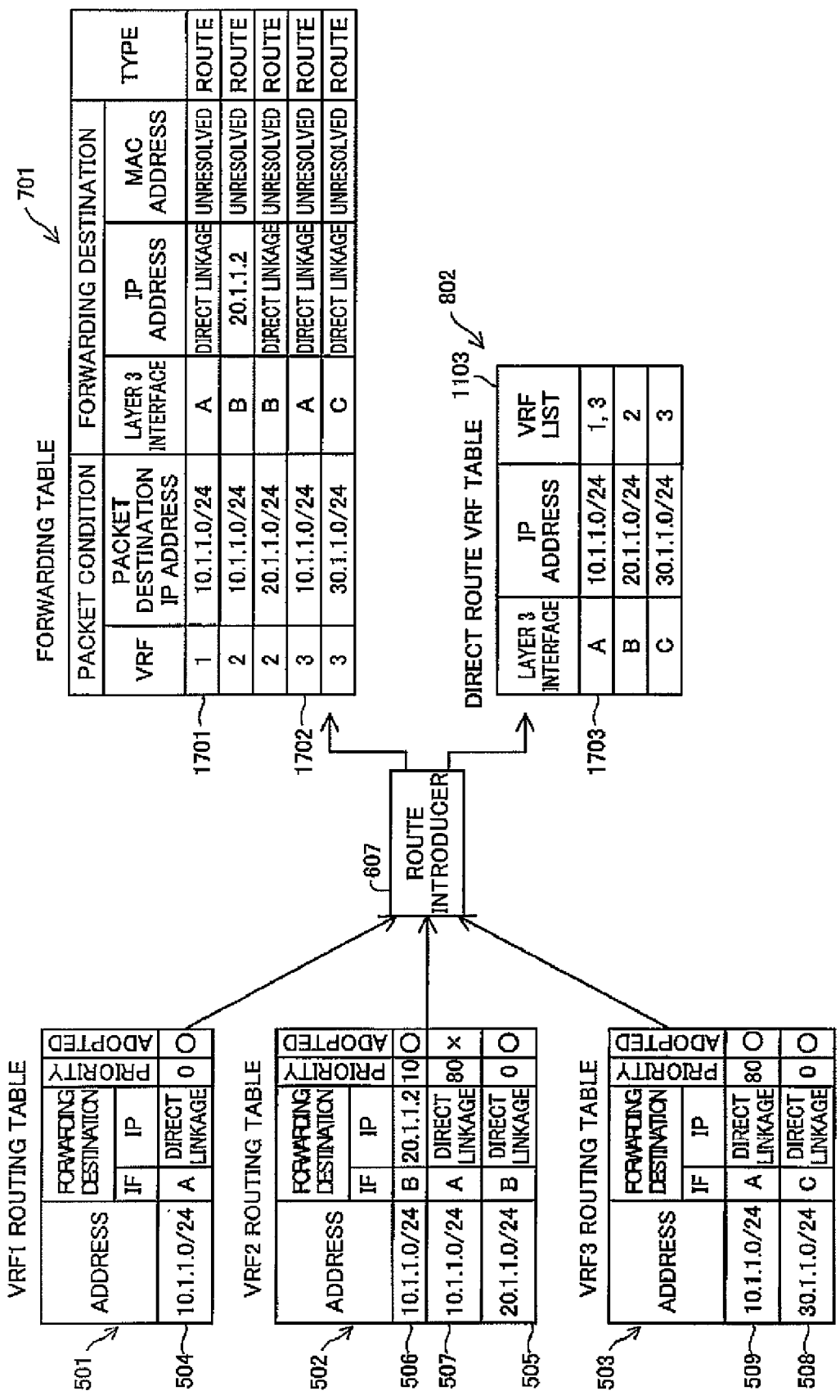
FIG. 16 is an explanatory view showing modification of the forwarding table and the direct route VRF table by the function of the route introducer in the first embodiment.
Figure 17:
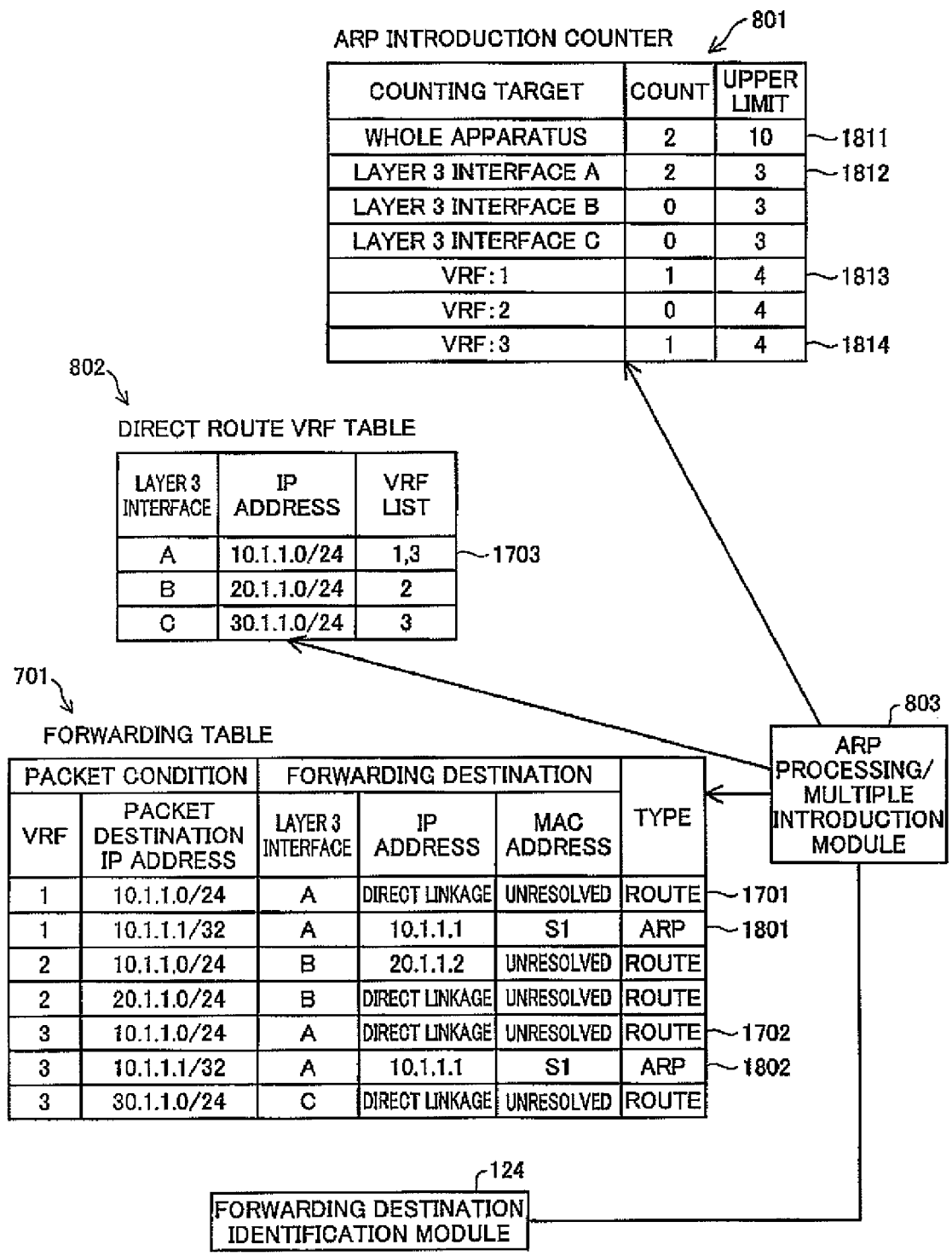
FIG. 17 is an explanatory view showing an ARP learning process performed by the inter-VRF forwarding apparatus of the first embodiment in response to reception of an ARP packet from a server S1.

FIG. 16 shows modification of the forwarding table 701 and the direct route VRF table 802 by the function of the route introducer 607. The routing tables 501 through 503 shown in the left side of FIG. 16 are equivalent to the routing tables 501 through 503 shown in FIG. 13. As illustrated, the route introducer 607 introduces the routes into the forwarding table 701 based on the contents of the routing tables 501 through 503 and introduces the direct routes and the extranet direct routes into the direct route VRF table 802.

The forwarding table 701 shown in FIG. 16 shows the state immediately after introduction of routes based on the routing tables 501 through 503 provided in the VRF1 (412) through the VRF3 (414). The items other than the type 708 in the forwarding table 701 are identical with the items in the forwarding table 123 of the reference example shown in FIG. 14. All the entries in the forwarding table 701 are introduced by the route introducer 607 and accordingly have the type 708 'route'.

When the route to be introduced in the forwarding table 701 is either a direct route or an extranet direct route, the route introducer 607 records an entry including the forwarding destination layer 3 interface of the route, the packet destination IP address, and the VRF identifier of the VRF including the route-recording routing table into the direct route VRF table 802. When the direct route VRF table 802 already has an entry having the combination of the forwarding destination layer 3 interface and the packet destination IP address, the VRF identifier is added to the VRF list of the entry.

The forwarding table 701 of FIG. 16 includes an entry 1701 as a result of introduction of the direct route 504 of the VRF1 (412) to the layer 3 interface A (415) and an entry 1702 as a result of introduction of the extranet direct route 509 of the VRF3 (414) to the layer 3 interface A (415). The direct route VRF table 802 has an entry 1703 for the layer 3 interface A (415). Both the VRF1 (412) related to introduction of the direct route 504 and the VRF3 (414) related to introduction of the extranet direct route 509 are recorded in a VRF list 1103 of the entry 1703.

FIG. 17 shows an ARP learning process performed by the inter-VRF forwarding apparatus 600 in response to reception of an ARP packet from the server S1 (407). The direct route VRF table 802 shown in FIG. 17 is identical with the direct route VRF table 802 shown in FIG. 16. When the inter-VRF forwarding apparatus 600 receives an ARP packet from the server S1 (407), the forwarding destination identification module 124 sends an ARP packet receipt notification to the ARP processing/multiple introduction module 803, and simultaneously notifies the ARP processing/multiple introduction module 803 of the received ARP packet and the packet-receiving layer 3 interface A.

The ARP processing/multiple introduction module 803 refers to the notified ARP packet and packet-receiving layer 3 interface and settles the learnt IP address: 10.1.1.1, the learnt MAC address: S1, and the learnt layer 3 interface: A (step S10 in the flowchart of FIG. 8). The ARP processing/multiple introduction module 803 subsequently searches the forwarding table 702 to retrieve any entry having the forwarding destination layer 3 interface and the forwarding destination IP address identical with the leant ARP information and rewrites the forwarding destination MAC address of each retrieved entry (step S20 in FIG. 18). In this case, since there is no forwarding table entry satisfying the condition, no forwarding table entry is the object of rewriting. The ARP processing/multiple introduction module 803 then searches the direct route VRF table 802 with the learnt layer 3 interface: A and the learnt IP address: 10.1.1.1 as search keys to retrieve an entry 1703 and obtains VRF list (including the VRF1 and the VRF2) of the retrieved entry 1703 (step S30 in FIG. 8).

The ARP processing/multiple introduction module 803 extracts the VRF1 from the obtained VRF list (step S40 in FIG. 8) and selects an entry 1811 for the counting target 'whole apparatus', an entry 1812 for the layer 3 interface A, and an entry 1813 for the VRF1 from the ARP introduction counter 801 (step S50 in FIG. 8). It is then determined whether there is any entry having its count reaching or exceeding its upper limit among the selected entries 1811, 1812, and 1813 (step S60 in FIG. 8). Since none of the selected entries 1811, 1812, and 1813 has the count reaching or exceeding the upper limit, the ARP processing/multiple introduction module 803 increments the count of each of the selected entries 1811, 1812, and 1813 by one (step S70 in FIG. 8). The ARP processing/multiple introduction module 803 then introduces the ARP information learnt for the VRF1 into the forwarding table 701 (step S80 in FIG. 8). The learnt and introduced ARP information is an entry 1801 in the forwarding table 701 of FIG. 17.

The ARP processing/multiple introduction module 803 subsequently extracts the VRF3 from the obtained VRF list (step S40 in FIG. 8) and selects the entry 1811 for the counting target 'whole apparatus', the entry 1812 for the layer 3 interface A, and an entry 1814 for the VRF3 from the ARP introduction counter 801 (step S50 in FIG. 8). Since none of the selected entries 1811, 1812, and 1814 has the count reaching or exceeding the upper limit, the ARP processing/multiple introduction module 803 increments the count of each of the selected entries 1811, 1812, and 1814 by one (step S70 in FIG. 8). The ARP processing/multiple introduction module 803 then introduces the ARP information learnt for the VRF3 into the forwarding table 701 (step S80 in FIG. 8). The learnt and introduced ARP information is an entry 1802 in the forwarding table 701 of FIG. 17.

As the result of introduction of the ARP information, a packet received in the VRF1 (412) to be sent to the address 10.1.1.1 is matched with the entry 1801 in the forwarding table 701. Based on the forwarding destination layer 3 interface: A and the forwarding destination MAC address: S1 of the matched entry 1801, the packet is forwarded to the server S1 (407).

A packet received in the VRF3 (414) to be sent to the address 10.1.1.1 is matched with the entry 1802 in the forwarding table 701. Based on the forwarding destination layer 3 interface: A and the forwarding destination MAC address: S1 of the matched entry 1802, the packet is forwarded to the server S1 (407). The packet received in the VRF3 (414) to be sent to the address 10.1.1.1 is non-transferable in the reference example as described previously.

The VPN network of FIG. 12 adopting the inter-VRF forwarding apparatus 100 of the reference example does not allow packet forwarding from the VRF3 (414) to the LAN11 (404) by the extranet communication 2 (419), while the VPN network of FIG. 12 adopting the inter-VRF forwarding apparatus 600 of the first embodiment allows packet forwarding from the VRF3 (414) to the LAN11 (404) by the extranet communication 2 (419). This arrangement desirably simplifies the structure of the packet forwarding unit 621 included in the inter-VRF forwarding apparatus 600 supporting the direct extranet communication to reduce the manufacturing cost of the inter-VRF forwarding apparatus 600, increase the speed of packet forwarding, and lower the power consumption.

The system administrator sets the upper limit to the number of the forwarding table entries based on the learnt ARP information with regard to each of the counting targets 1201, the whole apparatus, the individual layer 3 interfaces, and the individual VRFs, in the ARP introduction counter 801. Such limitation of the numbers of the forwarding table entries based on the learnt ARP information of each layer 3 device, such as the server S1, desirably prevents entries based on the learnt ARP information from occupying all the space of the forwarding table entries and thereby assures the space for introducing a new data route.

The limitation of the numbers of the forwarding table entries based on the learnt ARP information with regard to the individual layer 3 interfaces desirably prevents entries of a certain layer 3 interface based on the learnt ARP information from occupying all the space of the forwarding table entries and thereby assures the space for introducing ARP information of another layer 3 interface.

The limitation of the numbers of the forwarding table entries based on the learnt ARP information with regard to the individual VRFs desirably prevents entries of a certain VRF as the packet condition VRF based on the learnt ARP information from occupying all the space of the forwarding table entries and thereby assures the space for introducing ARP information of another VRF as the packet condition VRF.

According to a request, the system administrator is informed of the count and the upper limit of the forwarding table entry based on the learnt ARP information with regard to each of the counting targets 1201, the whole apparatus, the individual layer 3 interfaces, and the individual VRFs. The system administrator can thus predict the risk of occupying all the space of the forwarding table entries and identify a VRF or a layer 3 interface as the cause of such full occupancy.

When the learnt ARP information is invalid, the inter-VRF forwarding apparatus 600 of the embodiment can readily restore the forwarding table to the previous state before the introduction of the learnt ARP information.

C. Second Embodiment

Another inter-VRF forwarding apparatus is described below as a second embodiment of the invention.

C-1. System Configuration (FIG. 18)

Figure 18:
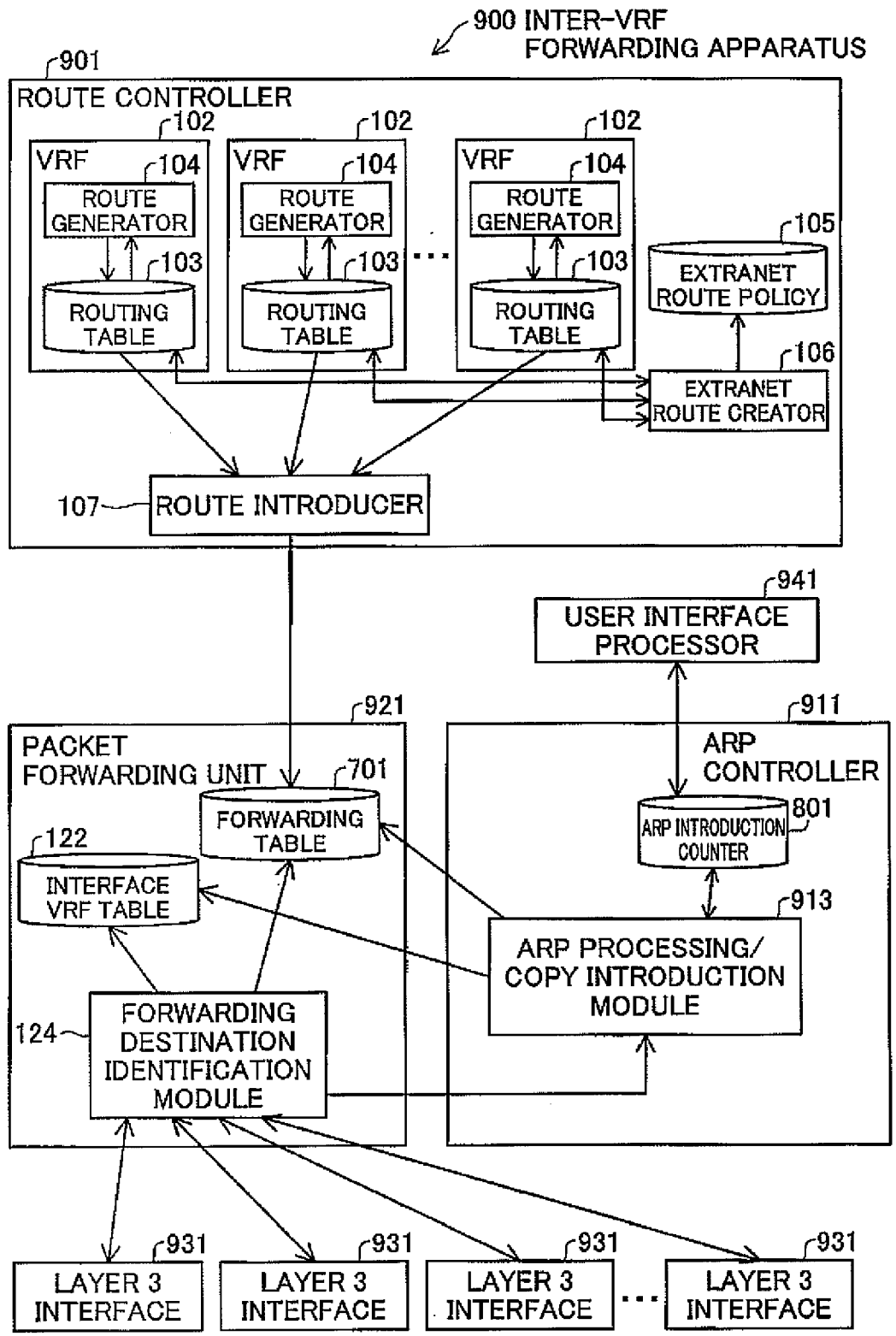
FIG. 18 is a block diagram schematically illustrating the general configuration of an inter-VRF forwarding apparatus in a second embodiment of the invention.

FIG. 18 schematically illustrates the general configuration of an inter-VRF forwarding apparatus 900 in the second embodiment of the invention. The inter-VRF forwarding apparatus 900 includes a route controller 901, an ARP controller 911, a packet forwarding unit 921, multiple layer 3 interfaces 931, and a user interface processor 941. According to the comparison between the inter-VRF forwarding apparatus 900 of the embodiment and the inter-VRF forwarding apparatus 100 of the reference example (see FIG. 1), the inter-VRF forwarding apparatus 900 of the embodiment includes the similar units to those of the inter-VRF forwarding apparatus 100 of the reference example except the presence of the user interface processor 941. The common structures and the differences of the respective units between the inter-VRF forwarding apparatus 900 and the inter-VRF forwarding apparatus 100 are explained below.

The route controller 901 of the inter-VRF forwarding apparatus 900 of this embodiment is identical with the route controller 101 of the inter-VRF forwarding apparatus 100 of the reference example. The packet forwarding unit 921 of the inter-VRF forwarding apparatus 900 of the second embodiment is identical with the packet forwarding unit 621 of the inter-VRF forwarding apparatus 600 of the first embodiment. The like constituents to those of the reference example or the first embodiment are expressed by the like numerals. The forwarding table 701 included in the packet forwarding unit 921 of the second embodiment is identical with the forwarding table 701 included in the packet forwarding unit 621 of the first embodiment.

The ARP controller 911 in the inter-VRF forwarding apparatus 900 of the embodiment has an ARP introduction counter 801 and an ARP processing/copy introduction module 913, while the ARP controller 111 in the inter-VRF forwarding apparatus 100 of the reference example has only the ARP processor 112 as explained above. The ARP introduction counter 801 included in the ARP controller 911 of the second embodiment is identical with the ARP introduction counter 801 included in the ART controller 611 of the first embodiment and is expressed by the same numeral. The ARP processing/copy introduction module 913 of the embodiment is equivalent to the 'address resolving module' of the invention.

In the ARP controller 911, the ARP processing/copy introduction module 913 is connected with the ARP introduction counter 801. The ARP processing/copy introduction module 913 is also connected with the forwarding table 701, the interface VRF table 122, and the forwarding destination identification module 124 of the packet forwarding unit 621.

The multiple layer 3 interfaces 931 in the inter-VRF forwarding apparatus 900 of the embodiment are identical with the multiple layer 3 interfaces 131 in the inter-VRF forwarding apparatus 100 of the reference example.

The inter-VRF forwarding apparatus 900 of the embodiment has the user interface processor 941, which is not included in the inter-VRF forwarding apparatus 100 of the reference example. The user interface processor 941 is connected with a terminal device operated by a system administrator and is designed to interpret the administrator's command or instruction received from the terminal device and to send back the processing result of the command or instruction to the terminal device. The user interface processor 941 is connected with the ARP introduction counter 801 of the ARP controller 911.

C-2. Processing Operations (FIGS. 19-23)

The ARP processing/copy introduction module 913 performs an additional series of processing, in addition to the ARP resolving process performed by the ARP processor 112 of the reference example. In the inter-VRF forwarding apparatus 900, when the search result of a received packet in the forwarding table 701 shows an ARP-unresolved entry or an ARP-unsolvable entry having the forwarding destination MAC address equal to the value representing the status 'unresolved', the forwarding destination identification module 124 sends an 'unresolved' notification to the ARP processing/copy introduction module 913. In response to reception of the 'unresolved' notification from the forwarding destination identification module 124, the ARP processing/copy introduction module 913 performs an ARP resolving process.

FIG. 19 is a flowchart showing a procedure of ARP learning process performed by the ARP processing/copy introduction module 913, which is actualized by a CPU of the inter-VRF forwarding apparatus 900 of the embodiment. In response to reception of the 'unresolved' notification from the forwarding destination identification module 124, the CPU obtains the forwarding destination layer 3 interface, the forwarding destination IP address, the packet destination IP address, and the packet-receiving VRF (step S210). The CPU subsequently searches the interface VRF table 122 with the forwarding destination layer 3 interface as a search key to specify the VRF of the forwarding destination layer 3 interface (step S220).

The CPU then determines whether a forwarding table entry retrieved as the result of the search in the forwarding table 701 with regard to the received packet causing the 'unresolved' notification by the forwarding destination identification module 124 is an extranet direct route (step S230). The forwarding table entry retrieved as the cause of the 'unresolved' notification is a direct route in the case where the forwarding destination IP address in the notification shows the direct linkage. The retrieved rewarding table entry is an extranet route in the case where the packet-receiving VRF is different from the specified VRF of the forwarding destination layer 3 interface. The forwarding table entry is determined as an extranet direct route upon satisfaction of both the conditions.

Upon determination of no extranet direct route at step S230, the CPU sends an ARP request packet to resolve the forwarding destination IP address for the forwarding destination layer 3 interface according to the ordinary ARP resolving process (step S240) and terminates this processing routine. Upon determination of an extranet direct route at step S230, on the other hand, the CPU searches the forwarding table 701 with the specified VRF of the forwarding destination layer 3 interface and the packet destination IP address as search keys, in order to retrieve learnt ARP information (step S250). The presence of the learnt ARP information is determined, based on whether the type of a forwarding table entry retrieved as the search result is ARP (step S260). When the type of the retrieved entry is ARP, the retrieved entry is regarded as the ARP information of the forwarding destination.

In the presence of the leant ARP information at step S260, the CPU obtains entries of the whole apparatus, the packet-receiving VRF, and the forwarding destination layer 3 interface as the counting target from the ARP introduction counter 801 (step S270). The CPU then determines whether there is any entry having its count reaching or exceeding its upper limit (step S280). Upon determination at step S280 that there is any entry having its count reaching or exceeding its upper limit, the CPU immediately terminates this processing routine without executing the subsequent steps S290 and S300.

Upon determination at step S280 that there is no entry having its count reaching or exceeding its upper limit, on the other hand, the CPU increments the count of each entry by one (step S290) and introduces the learnt ARP information including the packet-receiving VRF as the packet condition VRF into the forwarding table 701 (step S300). On completion of step S300, the CPU terminates this processing routine.

In the absence of the learnt ARP information at step S260, on the other hand, the CPU obtains entries of the whole apparatus, the packet-receiving VRF, and the forwarding destination layer 3 interface as the counting target from the ARP introduction counter 801 (step S310). The CPU then determines whether there is any entry having its count reaching or exceeding its upper limit (step S320). Upon determination at step S320 that there is any entry having its count reaching or exceeding its upper limit, the CPU immediately terminates this processing routine without executing the subsequent steps S330, S340, and S350.

Upon determination at step S320 that there is no entry having its count reaching or exceeding its upper limit, on the other hand, the CPU increments the count of each entry by one (step S330) and introduces ARP information including an 'unresolved' forwarding destination MAC address in correlation to the forwarding destination layer 3 interface and the forwarding destination IP address and the packet-receiving VRF as the packet condition VRF into the forwarding table 701 (step S340). The CPU then sends an ARP request packet to resolve the forwarding destination IP address for the forwarding destination layer 3 interface (step S350) and terminates this processing routine.

On reception of an ARP packet from a forwarding destination device as a response to the ARP request packet sent at step S350, the ARP processing/copy introduction module 913 performs the ARP learning process to rewrite the forwarding destination MAC address to the learnt MAC address for each of all the entries having the forwarding destination layer 3 interface and the forwarding destination IP address identical with the layer 3 interface and the IP address of the learnt ARP information in the forwarding table 701. The ARP learning process also rewrites the 'unresolved' forwarding destination MAC address introduced at step S340 to the MAC address of the learnt ARP information.

In response to reception of an ARP packet receipt notification from the forwarding destination identification module 124, the ARP processing/copy introduction module 913 performs the ARP learning process to rewrite the forwarding destination of each condition-satisfying entry in the forwarding table 701 and introduce the learnt ARP information into the forwarding table 701. The concrete procedure of the ARP learning process rewrites the forwarding destination MAC address 307 (see FIG. 5) to the learnt MAC address for each of all the entries having the forwarding destination layer 3 interface 305 (see FIG. 5) identical with the packet-receiving layer 3 interface of the received ARP packet and the forwarding destination IP address 306 (see FIG. 5) identical with the learnt IP address of the ARP packet in the forwarding table 701. The ARP learning process subsequently searches the interface VRF table 122 with the packet-receiving layer 3 interface of the ARP packet as a search key to specify a VRF. The learnt ARP information including the specified VRF as the packet condition VRF 302 (see FIG. 5) is introduced into the forwarding table 701.

The ARP processing/copy introduction module 913 also performs the ARP deletion process that is identical with the ARP deletion process of the first embodiment described above.

The user interface processor 941 of the second embodiment executes the required series of processing in response to an introduced ARP count display command 1501 (see FIG. 10) and sends the resulting information to a terminal device operated by the system administrator. The user interface processor 941 also executes the required series of processing in response to an upper limit setting command 1601 (see FIG. 11) and sends the resulting information to the terminal device operated by the system administrator. These series of processing performed by the user interface processor 941 are identical with those performed by the user interface processor 641 of the first embodiment described previously.

The inter-VRF forwarding apparatus 900 of the second embodiment discussed above is applied to the VPN network of FIG. 12. In the description hereafter, the inter-VRF forwarding apparatus 900 of the second embodiment is adopted for the inter-VRF forwarding apparatus 411 shown in FIG. 12.

FIG. 20 shows the contents of the forwarding table 701 with introduction of routes by the route introducer 107 based on the routing table of FIG. 13 in the inter-VRF forwarding apparatus 900. The respective entries of the forwarding table 701 shown in FIG. 20 are identical with those of the first embodiment shown in FIG. 16. The type is 'route' for all the entries.

A working example is described below in the VPN network of FIG. 12 with application the inter-VRF forwarding apparatus 900 of the second embodiment. In the working example, the inter-VRF forwarding apparatus 900 makes communication from the terminal device T3 (410) to the server S1 (407) after learning the ARP information of the server S1 (407) in the state of the forwarding table 701 shown in FIG. 20. The ARP learning process, the processing in response to reception of a first packet by communication, and the processing in response to reception of a second or subsequent packet by communication are explained below in this sequence.

The inter-VRF forwarding apparatus 900 performs the ARP learning process. In the state of the forwarding table 701 shown in FIG. 20, when the inter-VRF forwarding apparatus 900 receives an ARP packet from the server S1 (407), the ARP processing/copy introduction module 913 refers to the received ARP packet and the packet-receiving layer 3 interface and specifies the learnt IP address: 10.1.1.1, the learnt MAC address: S1, and the learnt layer 3 interface: A.

The ARP processing/copy introduction module 913 rewrites the forwarding destination MAC address to the learnt MAC address for any entry having the forwarding destination layer 3 interface and the forwarding destination IP address identical with the learnt layer 3 interface and the learnt IP address in the forwarding table 701. In the forwarding table 701 of FIG. 20, however, there is no entry having the forwarding destination layer 3 interface and the forwarding destination IP address identical with the learnt layer 3 interface: A and the learnt IP address: 10.1.1.1. Namely no entry in the forwarding table 701 is the object of rewriting the forwarding destination MAC address.

The ARP processing/copy introduction module 913 subsequently introduces the learnt ARP information specifying the VRF of the learnt layer 3 interface into the forwarding table 701. The concrete procedure searches the interface VRF table 122 with the learnt layer 3 interface: A as a search key to specify a VRF: 1 and introduces the learnt ARP information including the specified VRF: 1 of the learnt layer 3 interface into the forwarding table 701. The contents of the forwarding table 701 as the result of such introduction are shown in FIG. 21. A forwarding table entry 2101 is introduced in the forwarding table 701.

The inter-VRF forwarding apparatus 900 performs the following series of processing in response to reception of a first packet by communication. In the state of the forwarding table 701 shown in FIG. 21, when the inter-VRF forwarding apparatus 900 receives a packet addressed to the server S1 (407) from the terminal device T3 (410), the forwarding destination identification module 124 searches the interface VRF table 122 with the packet-receiving layer 3 interface: C as a search key to specify a packet-receiving VRF: 3. The forwarding destination identification module 124 subsequently searches the forwarding table 701 in the state of FIG. 21 with the packet-receiving VRF: 3 and the packet destination IP address: 10.1.1.1 as search keys to retrieve a forwarding table entry 2002. The forwarding destination identification module 124 reads the forwarding table entry 2002 to extract the forwarding destination MAC address: 'unresolved' and sends an 'unresolved' notification to the ARP processing/copy introduction module 913.

In response to reception of the 'unresolved' notification from the forwarding destination identification module 124, the ARP processing/copy introduction module 913 performs the series of processing according to the flowchart of FIG. 19. The ARP processing/copy introduction module 913 obtains the forwarding destination layer 3 interface: A, the forwarding destination IP address: direct linkage, the packet destination IP address: 10.1.1.1, and the packet-receiving VRF: 3 from the forwarding destination identification module 124 (step S210). The ARP processing/copy introduction module 913 searches the interface VRF table 122 with the forwarding destination layer 3 interface: A as a search key to specify the VRF: 1 of the forwarding destination layer 3 interface (step S220). The ARP processing/copy introduction module 913 then determines whether a forwarding table entry retrieved as the result of the search in the forwarding table 701 with regard to the received packet causing the 'unresolved' notification by the forwarding destination identification module 124 is an extranet direct route (step S230). The forwarding table entry retrieved as the cause of the 'unresolved' notification is a direct route because of the direct linkage as the forwarding destination IP address and is an extranet route because of the difference of the packet-receiving VRF: 3 from the specified VRF:1 of the forwarding destination layer 3 interface. The forwarding table entry is accordingly determined to be an extranet direct route.

Upon determination of an extranet direct route, the ARP processing/copy introduction module 913 searches the forwarding table 701 in the state of FIG. 21 with the specified VRF: 1 of the forwarding destination layer 3 interface and the packet destination IP address: 10.1.1.1 as search keys to retrieve the entry 2101 (step S250) and identifies the type of the entry 2101 retrieved at step S250 (step S260). Upon identification of ARP as the type of the retrieved entry 2101, the ARP processing/copy introduction module 913 obtains entries of the whole apparatus, the packet-receiving VRF: 3, and the forwarding destination layer 3 interface: A as the counting target from the ARP introduction counter 801 (step S270) and determines whether there is any entry having its count reaching or exceeding its upper limit (step S280). Since there is no entry satisfying the condition at step S280, the ARP processing/copy introduction module 913 increments the count of each entry by one (step S290) and introduces the learnt ARP information including the packet-receiving VRF: 3 as the packet condition VRF into the forwarding table 701 (step S300).

The contents of the forwarding table 701 as the result of such introduction are shown in FIG. 22. A forwarding table entry 2201 is introduced at step S300 in the forwarding table 701.

The inter-VRF forwarding apparatus 900 performs the following series of processing in response to reception of a second or subsequent packet by communication. In the state of the forwarding table 701 shown in FIG. 22, when the inter-VRF forwarding apparatus 900 receives a packet addressed to the server S1 (407) from the terminal device T3 (410), the forwarding destination identification module 124 searches the interface VRF table 122 with the packet-receiving layer 3 interface: C as a search key to specify the packet-receiving VRF: 3. The forwarding destination identification module 124 subsequently searches the forwarding table 701 in the state of FIG. 22 with the packet-receiving VRF: 3 and the packet destination IP address: 10.1.1.1 as search keys to retrieve the forwarding table entry 2201. The forwarding destination identification module 124 reads the forwarding table entry 2201 to extract the forwarding destination layer 3 interface: A and the forwarding destination MAC address: S1. The packet is according sent from the layer 3 interface A (415) to the MAC address: S1 and reaches the server S1.

As described above, the VPN network of FIG. 12 with application of the inter-VRF forwarding apparatus 900 of the second embodiment allows communication via an extranet direct route after learning the ARP information.

Another working example is described below in the VPN network of FIG. 12 with application the inter-VRF forwarding apparatus 900 of the second embodiment. In the working example, the inter-VRF forwarding apparatus 900 makes communication from the terminal device T3 (410) to the server S1 (407) before resolving the ARP information of the server S1 (407) in the state of the forwarding table 701 shown in FIG. 20. The processing in response to reception of a first packet by communication, the ARP learning process, and the processing in response to reception of a second or subsequent packet by communication are explained below in this sequence. The inter-VRF forwarding apparatus 900 (411) performs the following series of processing in response to reception of a first packet by communication.

In the state of the forwarding table 701 shown in FIG. 20, when the inter-VRF forwarding apparatus 900 receives a packet addressed to the server S1 (407) from the terminal device T3 (410), the forwarding destination identification module 124 searches the interface VRF table 122 with the packet-receiving layer 3 interface: C as a search key to specify a packet-receiving VRF: 3. The forwarding destination identification module 124 subsequently searches the forwarding table 701 in the state of FIG. 20 with the packet-receiving VRF: 3 and the packet destination IP address: 10.1.1.1 as search keys to retrieve the forwarding table entry 2002. The forwarding destination identification module 124 reads the forwarding table entry 2002 to extract the forwarding destination MAC address: 'unresolved' and sends an 'unresolved' notification to the ARP processing/copy introduction module 913.

In response to reception of the 'unresolved' notification from the forwarding destination identification module 124, the ARP processing/copy introduction module 913 performs the series of processing according to the flowchart of FIG. 19. The ARP processing/copy introduction module 913 obtains the forwarding destination layer 3 interface: A, the forwarding destination IP address: direct linkage, the packet destination IP address: 10.1.1.1, and the packet-receiving VRF: 3 from the forwarding destination identification module 124 (step S210). The ARP processing/copy introduction module 913 searches the interface VRF table 122 with the forwarding destination layer 3 interface: A as a search key to specify the VRF: 1 of the forwarding destination layer 3 interface (step S220).

The ARP processing/copy introduction module 913 then determines whether a forwarding table entry retrieved as the result of the search in the forwarding table 701 with regard to the received packet causing the 'unresolved' notification by the forwarding destination identification module 124 is an extranet direct route (step S230). The forwarding table entry retrieved as the cause of the 'unresolved' notification is a direct route because of the direct linkage as the forwarding destination IP address and is an extranet route because of the difference of the packet-receiving VRF: 3 from the specified VRF:1 of the forwarding destination layer 3 interface. The forwarding table entry is accordingly determined to be an extranet direct route.

Upon determination of an extranet direct route, the ARP processing/copy introduction module 913 searches the forwarding table 701 in the state of FIG. 20 with the specified VRF: 1 of the forwarding destination layer 3 interface and the packet destination IP address: 10.1.1.1 as search keys to retrieve an entry 2001 (step S250) and identifies the type of the entry 2001 retrieved at step S250 (step S260). Upon identification of route as the type of the retrieved entry 2001, the ARP processing/copy introduction module 913 performs the processing flow of and after step S310. The ARP processing/copy introduction module 913 obtains entries of the whole apparatus, the packet-receiving VRF: 3, and the forwarding destination layer 3 interface: A as the counting target from the ARP introduction counter 801 (step S310) and determines whether there is any entry having its count reaching or exceeding its upper limit (step S320). Since there is no entry satisfying the condition at step S320, the ARP processing/copy introduction module 913 increments the count of each entry by one (step S330) and introduces ARP information including an 'unresolved' forwarding destination MAC address in correlation to the forwarding destination layer 3 interface: A and the forwarding destination IP address: 10.1.1.1 and the packet-receiving VRF: 3 as the packet condition VRF into the forwarding table 701 (step S340). An ARP request packet is then sent from the layer 3 interface: A to inquire the forwarding destination IP address: 10.1.1.1 (step S350). The contents of the forwarding table 701 as the result of such introduction are shown in FIG. 23. A forwarding table entry 2301 is introduced at step S340 in the forwarding table 701.

The inter-VRF forwarding apparatus 900 performs the ARP learning process. In the state of the forwarding table 701 shown in FIG. 23, when the inter-VRF forwarding apparatus 900 receives an ARP packet from the server S1 (407), the ARP processing/copy introduction module 913 refers to the received ARP packet and the packet-receiving layer 3 interface and specifies the learnt IP address: 10.1.1.1, the learnt MAC address: S1, and the learnt layer 3 interface: A.

The ARP processing/copy introduction module 913 rewrites the forwarding destination MAC address to the learnt MAC address for any entry having the forwarding destination layer 3 interface and the forwarding destination IP address identical with the learnt layer 3 interface and the learnt IP address in the forwarding table 701. In the forwarding table 701 of FIG. 23, there is only one entry 2301 having the forwarding destination layer 3 interface and the forwarding destination IP address identical with the learnt layer 3 interface: A and the learnt IP address: 10.1.1.1. The forwarding destination MAC address of the entry 2301 is accordingly rewritten to the learnt MAC address: S1.

The ARP processing/copy introduction module 913 subsequently introduces the learnt ARP information specifying the VRF of the learnt layer 3 interface into the forwarding table 701. The concrete procedure searches the interface VRF table 122 with the learnt layer 3 interface: A as a search key to specify a VRF: 1 and introduces the learnt ARP information including the specified VRF: 1 of the learnt layer 3 interface into the forwarding table 701.

The result of the above processing changes the contents of the forwarding table 701 to the state of FIG. 22. The forwarding table entry 2201 is rewritten by the forwarding destination MAC address rewriting process, and the forwarding table entry 2101 is introduced by the ARP information introduction process.

The inter-VRF forwarding apparatus 900 performs the following series of processing in response to reception of a second or subsequent packet by communication. In the state of the forwarding table 701 shown in FIG. 22, when the inter-VRF forwarding apparatus 900 receives a packet addressed to the server S1 (407) from the terminal device T3 (410), the forwarding destination identification module 124 searches the interface VRF table 122 with the packet-receiving layer 3 interface: C as a search key to specify the packet-receiving VRF: 3. The forwarding destination identification module 124 subsequently searches the forwarding table 701 in the state of FIG. 22 with the packet-receiving VRF: 3 and the packet destination IP address: 10.1.1.1 as search keys to retrieve the forwarding table entry 2201. The forwarding destination identification module 124 reads the forwarding table entry 2201 to extract the forwarding destination layer 3 interface: A and the forwarding destination MAC address: S1. The packet is according sent from the layer 3 interface A (415) to the MAC address: S1 and reaches the server S1.

As described above, when communication via an extranet direct route is made in the state of unresolved ARP information, the VPN network of FIG. 12 with application of the inter-VRF forwarding apparatus 900 of the second embodiment allows communication via the extranet direct route immediately after learning the ARP information.

C-3. Functions and Effects

In the state where the ARP information has already been learnt according to the ARP resolving process by the ARP processing/copy introduction module 913, on a start of communication by an extranet direct route requiring the ARP information as the information on the forwarding destination, the inter-VRF forwarding apparatus 900 of the second embodiment introduces the learnt ARP information for the packet-receiving VRF of the communication into the forwarding table 701 (step S300 in FIG. 19) at the time of forwarding a first packet by communication. This arrangement allows communication by the extranet direct route.

On a start of communication by an extranet direct route in the state of 'unresolved' ARP information, the inter-VRF forwarding apparatus 900 of the second embodiment introduces the ARP information specifying an 'unresolved' forwarding destination MAC address for the packet-receiving VRF of the communication into the forwarding table 701 (step S340 in FIG. 19) at the time of forwarding a first packet by communication and sends an ARP request packet (step S350). The ARP learning process triggered by reception of an ARP packet in response to the ARP request packet rewrites the forwarding destination MAC address of the forwarding table entry introduced at step S340 according to the learnt ARP information. This arrangement allows communication by the extranet direct route immediately after learning of the ARP information.

The inter-VRF forwarding apparatus 900 of the second embodiment increments the count of each condition-satisfying entry by one in the ARP introduction counter 801 in the course of introduction of the learnt ARP information into the forwarding table 701. This process allows management of the counts of the forwarding table entries with regard to the respective counting targets, such as the whole apparatus, the individual layer 3 interfaces, and the individual VRFs, introduced by the ARP processing/copy introduction module 913. In the course of introduction of the ARP information into each VRF, the ARP processing/copy introduction module 913 confirms that the count of each condition-satisfying entry does not reach or exceed its upper limit in the ARP introduction counter 801. Introduction of the ARP information is prohibited when there is any condition-satisfying entry having its count reaching or exceeding its upper limit. This arrangement effectively assures that the counts of the forwarding table entries with regard to the respective counting targets, such as the whole apparatus, the individual layer 3 interfaces, and the individual VRFs, introduced by the ARP processing/copy introduction module 913 do not reach or exceed the respective upper limits specified by the system administrator.

In the inter-VRF forwarding apparatus 900 of the second embodiment, the ARP processing/copy introduction module 913 performs the ARP deletion process that is similar to the ARP deletion process performed by the ARP processing/ multiple introduction module 803 of the first embodiment. This arrangement allows deletion of all the forwarding table entries based on the ARP information of the deletion object. The inter-VRF forwarding apparatus 900 of the second embodiment manages the counts of the respective entries in the ARP introduction counter 801 and presents correct values in response to a request from the system administrator.

Like the user interface processor 641 of the first embodiment discussed above, the user interface processor 941 of the second embodiment performs the required series of processing in response to the introduced ARP count display command 1501 (see FIG. 10) and sends the resulting information to the terminal device operated by the system administrator. The system administrator is thus informed of the counts of the forwarding table entries with the type 'ARP' corresponding to the respective counting targets, such as the whole apparatus, the individual layer 3 interfaces, and the individual VRFs. Like the user interface processor 641 of the first embodiment discussed above, the user interface processor 941 of the second embodiment performs the required series of processing in response to the upper limit setting command 1601 (see FIG. 11) and sends the resulting information to the terminal device operated by the system administrator. This arrangement enables the system administrator to set the upper limits to the numbers of the respective forwarding table entries with the type 'ARP' corresponding to the respective counting targets, such as the whole apparatus, the individual layer 3 interfaces, and the individual VRFs.

D. Third Embodiment

The configuration of the first embodiment is applicable to an inter-VRF forwarding apparatus utilizing IPv6 as the layer 3 protocol. This application is described as a third embodiment.

The inter-VRF forwarding apparatus of the third embodiment has the configuration similar to that of the inter-VRF forwarding apparatus 600 of the first embodiment shown in FIG. 4, except an NDP controller instead of the ARP controller 611. The NDP controller has an NDP processing/multiple introduction module and an NDP introduction counter, in place of the ARP processing/multiple introduction module 803 and the ARP introduction counter 801.

The inter-VRF forwarding apparatus of the third embodiment includes a packet forwarding unit having the similar structure to that of the packet forwarding unit 621 of the first embodiment. In the inter-VRF forwarding apparatus of the third embodiment, when the result of search in the forwarding table 701 in response to reception of a packet shows an 'unresolved' forwarding destination MAC address, the forwarding destination identification module 124 sends an 'unresolved notification' to the NDP processing/multiple introduction module, while simultaneously notifying the NDP processing/multiple introduction module of a forwarding destination layer 3 interface, a forwarding destination IPv6 address, and a packet destination IPv6 address of the corresponding forwarding table entry. In response to reception of an NDP packet, the forwarding destination identification module 124 sends an NDP packet receipt notification to the NDP processing/multiple introduction module, while simultaneously notifying the NDP processing/multiple introduction module of the received NDP packet and the packet-receiving layer 3 interface.

An NDP resolving process, an NDP learning process, and an NDP deletion process performed by the NDP processing/multiple introduction module are similar to the ARP resolving process, the ARP learning process, and the ARP deletion process performed by the ARP processing/multiple introduction module 803. The packet format and the packet switching procedure should follow the NDP protocol. In the process of introducing or deleting NDP information into or from the forwarding table, the NDP processing/multiple introduction module should refer to the NDP introduction counter, in place of the ARP introduction counter 801 of the first embodiment.

Although not being specifically mentioned, the IP addresses and the ARPs in the tables, the series of processing, and the notifications of the first embodiment should be replaced by IPv6 addresses and NDPs.

The inter-VRF forwarding apparatus of the third embodiment adopting IPv6 for the layer 3 protocol has the similar functions and effects to those of the inter-VRF forwarding apparatus 600 of the first embodiment discussed above. Namely the inter-VRF forwarding apparatus of the third embodiment allows communication by an extranet direct route, informs the system administrator of the counts of the respective forwarding table entries based on the NDP information, enables the system administrator to set the upper limits to the numbers of the respective forwarding table entries based on the NDP information, and prohibits introduction of any forwarding table entry having the count reaching or exceeding its upper limit based on the NDP information.

E. Fourth Embodiment

The configuration of the second embodiment is applicable to an inter-VRF forwarding apparatus utilizing IPv6 as the layer 3 protocol. This application is described as a fourth embodiment.

The inter-VRF forwarding apparatus of the fourth embodiment has the configuration similar to that of the inter-VRF forwarding apparatus 900 of the second embodiment shown in FIG. 18, except an NDP controller instead of the ARP controller 911. The NDP controller has an NDP processing/copy introduction module and an NDP introduction counter, in place of the ARP processing/copy introduction module 913 and the ARP introduction counter 801.

The inter-VRF forwarding apparatus of the fourth embodiment includes a packet forwarding unit having the similar structure to that of the packet forwarding unit 921 of the second embodiment. In the inter-VRF forwarding apparatus of the fourth embodiment, when the result of search in the forwarding table 701 in response to reception of a packet shows an 'unresolved' forwarding destination MAC address, the forwarding destination identification module 124 sends an 'unresolved notification' to the NDP processing/copy introduction module, while simultaneously notifying the NDP processing/copy introduction module of a forwarding destination layer 3 interface, a forwarding destination IPv6 address, and a packet destination IPv6 address of the corresponding forwarding table entry. In response to reception of an NDP packet, the forwarding destination identification module 124 sends an NDP packet receipt notification to the NDP processing/copy introduction module, while simultaneously notifying the NDP processing/copy introduction module of the received NDP packet and the packet-receiving layer 3 interface.

An NDP resolving process, an NDP learning process, and an NDP deletion process performed by the NDP processing/copy introduction module are similar to the ARP resolving process, the ARP learning process, and the ARP deletion process performed by the ARP processing/copy introduction module 913. The packet format and the packet switching procedure should follow the NDP protocol. In the process of introducing or deleting NDP information into or from the forwarding table, the NDP processing/copy introduction module should refer to the NDP introduction counter, in place of the ARP introduction counter 801 of the first embodiment.

Although not being specifically mentioned, the IP addresses and the ARPs in the tables, the series of processing, and the notifications of the first embodiment should be replaced by IPv6 addresses and NDPs.

The inter-VRF forwarding apparatus of the fourth embodiment adopting IPv6 for the layer 3 protocol has the similar functions and effects to those of the inter-VRF forwarding apparatus 900 of the second embodiment discussed above. Namely the inter-VRF forwarding apparatus of the fourth embodiment allows communication by an extranet direct route, informs the system administrator of the counts of the respective forwarding table entries based on the NDP information, enables the system administrator to set the upper limits to the numbers of the respective forwarding table entries based on the NDP information, and prohibits introduction of any forwarding table entry having the count reaching or exceeding its upper limit based on the NDP information.

Like the inter-VRF forwarding apparatus 900 of the second embodiment, the inter-VRF forwarding apparatus of the fourth embodiment introduces the NDP information for an extranet direct route into the layer 2-layer 3-integrated forwarding table in the course of communication by the extranet direct route. Namely even when the NDP information has already been learnt, the learnt NDP information for the extranet direct route is not introduced into the layer 2-layer 3-integrated forwarding table prior to communication by the extranet direct route.

F. Other Aspects

The embodiments discussed above are to be considered in all aspects as illustrative and not restrictive. There may be many modifications, changes, and alterations without departing from the scope or spirit of the main characteristics of the present invention. Some examples of possible modification are given below.

F1. Modified Example 1

The inter-VRF forwarding apparatus 600 or 900 of each embodiment has the user interface processor 641 or 941. The user interface processor 641 or 941 may be omitted when not required.

F2. Modified Example 2

The above embodiments describe the inter-VRF forwarding apparatuses as applications of the forwarding apparatus of the invention. The forwarding method of the invention may also be actualized by a computer system, such as a personal computer.

Other aspects of the invention are discussed below.

In one preferable application, the forwarding apparatus of the invention has a second storage module configured to store a direct route VRF table that is structured to record at least one entry, wherein each entry includes a correspondence relation of a layer 3 interface and a layer 3 address to a VRF identifier group. In the forwarding apparatus of this application, the address resolving module searches the direct route VRF table with a layer 3 interface connected to the adjacent device and the layer 3 address of the adjacent device as search keys to obtain a VRF identifier group and uses each VRF identifier of the obtained VRF identifier group for the VRF information as the search condition of specifying the forwarding destination of the packet to introduce the adjacent device layer 3 address-to-layer 2 address correspondence relation into the layer 2-layer 3-integrated forwarding table.

In the forwarding apparatus of this application, the correspondence relation of the layer 3 interface and the layer 3 address to the VRF identifier group is written in the direct route VRF table. The adjacent device layer 3 address-to-layer 2 address correspondence relation is introduced into the layer 2-layer 3-integrated forwarding table by using each VRF identifier extracted from the VRF identifier group obtained by the search in the direct route VRF table. The forwarding apparatus accordingly uses the VRF information identical with the VRF information as the search condition for specifying the forwarding destination of the packet to introduce the adjacent device layer 3 address-to-layer 2 address correspondence relation into the layer 2-layer 3-integrated forwarding table. This arrangement allows communication by an extranet direct route.

In one preferable embodiment of the invention, the forwarding apparatus of the above application further includes a direct route VRF table updating module configured to, in the course of introduction of the direct route using the packet destination layer 3 address as the forwarding destination layer 3 address into the layer 2-layer 3-integrated forwarding table, record a VRF of the direct route corresponding to a forwarding destination layer 3 interface of the direct route and a packet destination layer 3 address of the direct route into the direct route VRF table. In the course of introduction of each direct route among multiple direct routes, which use the packet destination layer 3 address as the forwarding destination layer 3 address and have an identical forwarding destination layer 3 interface and an identical packet destination layer 3 address, into the layer 2-layer 3-integrated forwarding table, the direct route VRF table updating module adds a VRF identifier group of each direct route introduced in the layer 2-layer 3-integrated forwarding table to each corresponding entry including the forwarding destination layer 3 interface and the packet destination layer 3 address in the direct route VRF table.

The forwarding apparatus of this embodiment effectively assures introduction of the adjacent device layer 3 address-to-layer 2 address correspondence relation into the layer 2-layer 3-integrated forwarding table by using the VRF information identical with the VRF information as the search condition for specifying the forwarding destination of the packet.

In another preferable embodiment of the invention, the layer 2-layer 3-integrated forwarding table has a field for storing a type of each communication route that identifies whether the communication route is introduced by the route introducer or by the address resolving module. The forwarding apparatus of this embodiment further includes a deletion module configured to, in the case of invalid adjacent device layer 3 address-to-layer 2 address correspondence relation, check the type of each of any entry in the layer 2-layer 3-integrated forwarding table, which has a forwarding destination layer 3 interface and a forwarding destination layer 3 address identical with the layer 3 interface and the layer 3 address of the adjacent device, and to set an 'unresolved' forwarding destination layer 2 address for the entry having the type of the communication route introduced by the route introducer, while deleting the entry having the type of the communication route introduced by the address resolving module.

In the event of invalid adjacent device layer 3 address-to-layer 2 address correspondence relation, the forwarding apparatus of this embodiment readily restores the state of the layer 2-layer 3-integrated forwarding table to its previous state before introduction of the adjacent device layer 3 address-to-layer 2 address correspondence relation.

In one preferable structure, the forwarding apparatus of the above embodiment further has: multiple counters provided corresponding to multiple counting targets including a whole apparatus, individual VRFs, and individual layer 3 interfaces; a counter adder configured to, in the case of introduction of an entry including the adjacent device layer 3 address-to-layer 2 address correspondence relation into the layer 2-layer 3-integrated forwarding table, respectively increment by one a value of the counter provided for the whole apparatus, a value of the counter provided for a VRF as a search condition for specifying a forwarding destination of a packet in the introduced entry, and a value of the counter provided for a forwarding destination layer 3 interface of the introduced entry; and a counter subtractor configured to, in the case of deletion of an entry by introduction of the adjacent device layer 3 address-to-layer 2 address correspondence relation from the layer 2-layer 3-integrated forwarding table, respectively decrement by one the value of the counter provided for the whole apparatus, a value of the counter provided for a VRF as a search condition for specifying a forwarding destination of a packet in the deleted entry, and a value of the counter provided for a forwarding destination layer 3 interface of the deleted entry.

In the forwarding apparatus of this structure, the latest counts of the respective forwarding table entries can be recorded in the multiple counters provided for the respective counting targets including the whole apparatus, the individual VRFs, and the individual layer 3 interfaces.

In one preferable embodiment of the invention, the forwarding apparatus of the above structure further includes a user interface processor configured to transmit information to and from a terminal device operated by an operator. The user interface processor has a counter value transmitter configured to send a value of each counter to the terminal device, in response to reception of a command for obtaining values of the multiple counters from the terminal device.

The forwarding apparatus of this embodiment desirably informs the operator of the counts of the respective forwarding table entries corresponding to the respective counting targets including the whole apparatus, the individual VRFs, and the individual layer 3 interfaces.

In another preferable embodiment of the invention, the forwarding apparatus of the above structure further includes an upper limit storage module configured to store an upper limit set in advance for each of the multiple counters. In the forwarding apparatus of this embodiment, the address resolving module has an introduction prohibition module configured to prohibit introduction of the adjacent device layer 3 address-to-layer 2 address correspondence relation into the layer 2-layer 3-integrated forwarding table, when a value of at least one of the multiple counters reaches or exceeds the upper limit set for the counter.

The forwarding apparatus of this embodiment ensures effective management to prevent the counts of the respective forwarding table entries corresponding to the respective counting targets including the whole apparatus, the individual VRFs, and the individual layer 3 interfaces from exceeding the respective upper limits. Namely this arrangement facilitates resource management of the forwarding apparatus.

In one preferable application of the invention, the forwarding apparatus of the above embodiment further includes a user interface processor configured to transmit information to and from a terminal device operated by an operator. The user interface processor has: an upper limit change command receiving module configured to receive a command for changing at least one of the upper limits stored in the upper limit storage module from the terminal device; and an upper limit changing module configured to change at least one upper limit among the upper limits stored in the upper limit storage module, in response to the command received by the upper limit change command receiving module.

The forwarding apparatus of this application enables the operator to set the upper limits to the numbers of the respective forwarding table entries corresponding to the respective counting targets including the whole apparatus, the individual VRFs, and the individual layer 3 interfaces.

In one preferable application of the forwarding apparatus according to one aspect of the invention, the address resolving module has: a determination module configured to, upon specification of an 'unresolved' forwarding destination layer 2 address as a result of the search in the layer 2-layer 3-integrated forwarding table by the forwarding destination identification module, determine whether a corresponding entry as the result of the search is related to the direct route using the packet destination layer 3 address as the forwarding destination layer 3 address and whether a VRF as the search condition for specifying the forwarding destination of the packet is different from the VRF assigned to the forwarding destination layer 3 interface; a retrieval module configured to, in response to an affirmative determination by the determination module, search the layer 2-layer 3-integrated forwarding table with a forwarding destination layer 3 interface and a packet destination layer 3 address of the corresponding entry with the affirmative determination as search keys to retrieve a condition-satisfying adjacent device layer 3 address-to-layer 2 address correspondence relation; and a first introduction module configured to, when the condition-satisfying adjacent device layer 3 address-to-layer 2 address correspondence relation retrieved by the retrieval module has already been learnt, use a packet-receiving VRF for the VRF information as the search condition for specifying the forwarding destination of the packet to introduce the learnt adjacent device layer 3 address-to-layer 2 address correspondence relation into the layer 2-layer 3-integrated forwarding table.

In the case of the learnt adjacent device layer 3 address-to-layer 2 address correspondence relation, the forwarding apparatus of this application allows communication by an extranet direct route.

In one preferable embodiment of the forwarding apparatus of this application, the address resolving module further has a second introduction module configured to, when the condition-satisfying adjacent device layer 3 address-to-layer 2 address correspondence relation retrieved by the retrieval module has not yet been resolved, introduce a certain entry into the layer 2-layer 3-integrated forwarding table, wherein the certain entry includes the packet-receiving VRF for the VRF information as the search condition for specifying the forwarding destination of the packet, the packet destination layer 3 address of the corresponding entry for the layer 3 address as the search condition, the forwarding destination layer 3 interface of the corresponding entry as the forwarding destination layer 3 interface, the packet destination layer 3 address as the forwarding destination layer 3 address, and a value representing an 'unresolved state' as the forwarding destination layer 2 address.

Even in the case of the 'unresolved' adjacent device layer 3 address-to-layer 2 address correspondence relation, the forwarding apparatus of this embodiment allows communication by an extranet direct route immediately after learning the forwarding destination layer 2 address of the forwarding table entry.

In another preferable embodiment of the forwarding apparatus of the above application, the layer 2-layer 3-integrated forwarding table has a field for storing a type of each communication route that identifies whether the communication route is introduced by the route introducer or by the address resolving module. The forwarding apparatus of this embodiment further includes a deletion module configured to, in the case of invalid adjacent device layer 3 address-to-layer 2 address correspondence relation, check the type of each of any entry in the layer 2-layer 3-integrated forwarding table, which has a forwarding destination layer 3 interface and a forwarding destination layer 3 address identical with the layer 3 interface and the layer 3 address of the adjacent device, and to set an 'unresolved' forwarding destination layer 2 address for the entry having the type of the communication route introduced by the route introducer, while deleting the entry having the type of the communication route introduced by the address resolving module.

In the event of invalid adjacent device layer 3 address-to-layer 2 address correspondence relation, the forwarding apparatus of this embodiment readily restores the state of the layer 2-layer 3-integrated forwarding table to its previous state before introduction of the adjacent device layer 3 address-to-layer 2 address correspondence relation.

In one preferable structure, the forwarding apparatus of the above embodiment further has: multiple counters provided corresponding to multiple counting targets including a whole apparatus, individual VRFs, and individual layer 3 interfaces; a counter adder configured to, in the case of introduction of an entry including the adjacent device layer 3 address-to-layer 2 address correspondence relation into the layer 2-layer 3-integrated forwarding table, respectively increment by one a value of the counter provided for the whole apparatus, a value of the counter provided for a VRF as a search condition for specifying a forwarding destination of a packet in the introduced entry, and a value of the counter provided for a forwarding destination layer 3 interface of the introduced entry; and a counter subtractor configured to, in the case of deletion of an entry by introduction of the adjacent device layer 3 address-to-layer 2 address correspondence relation from the layer 2-layer 3-integrated forwarding table, respectively decrement by one the value of the counter provided for the whole apparatus, a value of the counter provided for a VRF as a search condition for specifying a forwarding destination of a packet in the deleted entry, and a value of the counter provided for a forwarding destination layer 3 interface of the deleted entry.

In the forwarding apparatus of this structure, the latest counts of the respective forwarding table entries can be recorded in the multiple counters provided for the respective counting targets including the whole apparatus, the individual VRFs, and the individual layer 3 interfaces.

In one preferable embodiment of the invention, the forwarding apparatus of the above structure further includes a user interface processor configured to transmit information to and from a terminal device operated by an operator. The user interface processor has a counter value transmitter configured to send a value of each counter to the terminal device, in response to reception of a command for obtaining values of the multiple counters from the terminal device.

The forwarding apparatus of this embodiment desirably informs the operator of the counts of the respective forwarding table entries corresponding to the respective counting targets including the whole apparatus, the individual VRFs, and the individual layer 3 interfaces.

In another preferable embodiment of the invention, the forwarding apparatus of the above structure further includes an upper limit storage module configured to store an upper limit set in advance for each of the multiple counters. In the forwarding apparatus of this embodiment, the address resolving module has an introduction prohibition module configured to prohibit introduction of the adjacent device layer 3 address-to-layer 2 address correspondence relation into the layer 2-layer 3-integrated forwarding table, when a value of at least one of the multiple counters reaches or exceeds the upper limit set for the counter.

The forwarding apparatus of this embodiment ensures effective management to prevent the counts of the respective forwarding table entries corresponding to the respective counting targets including the whole apparatus, the individual VRFs, and the individual layer 3 interfaces from exceeding the respective upper limits. Namely this arrangement facilitates resource management of the forwarding apparatus.

In one preferable application of the invention, the forwarding apparatus of the above embodiment further includes a user interface processor configured to transmit information to and from a terminal device operated by an operator. The user interface processor has: an upper limit change command receiving module configured to receive a command for changing at least one of the upper limits stored in the upper limit storage module from the terminal device; and an upper limit changing module configured to change at least one upper limit among the upper limits stored in the upper limit storage module, in response to the command received by the upper limit change command receiving module.

The forwarding apparatus of this application enables the operator to set the upper limits to the numbers of the respective forwarding table entries corresponding to the respective counting targets including the whole apparatus, the individual VRFs, and the individual layer 3 interfaces.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A forwarding apparatus including multiple VPN routing and forwarding tables (VRFs) configured to individually have routing tables provided for respective virtual private networks (VPNs), wherein each of the routing tables is structured to record a communication route of a packet based on a layer 3 address specifying an address of the packet and a forwarding destination layer 3 address specifying a forwarding destination of the packet from an assigned VRF or a VRF assigned to the routing table, as well as an extranet communication route of forwarding the packet from the assigned VRF to another VRF, the forwarding apparatus comprising:

a first storage module configured to store a layer 2-layer 3-integrated forwarding table structured to record at least one entry, wherein each entry includes VRF information and a packet destination layer 3 address as search conditions for specifying the forwarding destination of the packet, as well as a forwarding destination layer 3 interface, a forwarding destination layer 3 address, and a forwarding destination layer 2 address as search results, when a correspondence relation of the forwarding destination layer 3 address to the forwarding destination layer 2 address is unresolved for an entry, the entry including specific data representing an 'unresolved' state of the forwarding destination layer 2 address;

a route introducer configured to introduce each communication route, which is recorded in each of the routing tables, into the layer 2-layer 3-integrated forwarding table;

an address resolving module configured to introduce a correspondence relation of a layer 3 address to a layer 2 address of an adjacent device as an adjacent device layer 3 address-to-layer 2 address correspondence relation with regard to the forwarding destination layer 3 interface of an entry recorded in the layer 2-layer 3-integrated forwarding table, into the layer 2-layer 3-integrated forwarding table; and a forwarding destination identification module configured to search the layer 2-layer 3-integrated forwarding table with a layer 3 address specifying an address recorded in the packet as a search key to specify the forwarding destination of the packet, in response to presence of an entry, which includes a direct route using a packet destination layer 3 address as the forwarding destination layer 3 address and the VRF information as the search condition for specifying the forwarding destination of the packet that is different from a VRF assigned to the forwarding destination layer 3 interface, in the layer 2-layer 3-integrated forwarding table, the address resolving module utilizing VRF information identical with the VRF information as the search condition to introduce the adjacent device layer 3 address-to-layer 2 address correspondence relation into the layer 2-layer 3-integrated forwarding table;

a second storage module configured to store a direct route VRF table that is structured to record at least one entry, wherein each entry includes a correspondence relation of a layer 3 interface and a layer 3 address to a VRF identifier group, wherein the address resolving module searches the direct route VRF table with a layer 3 interface connected to the adjacent device and the layer 3 address of the adjacent device as search keys to obtain a VRF identifier group and uses each VRF identifier of the obtained VRF identifier group for the VRF information as the search condition of specifying the forwarding destination of the packet to introduce the adjacent device layer 3 address-to-layer 2 address correspondence relation into the layer 2-layer 3-integrated forwarding table.

2. The forwarding apparatus in accordance with claim 1, the forwarding apparatus further including:

a direct route VRF table updating module configured to, in the course of introduction of the direct route using the packet destination layer 3 address as the forwarding destination layer 3 address into the layer 2-layer 3-integrated forwarding table, record a VRF of the direct route corresponding to a forwarding destination layer 3 interface of the direct route and a packet destination layer 3 address of the direct route into the direct route VRF table, in the course of introduction of each direct route among multiple direct routes, which use the packet destination layer 3 address as the forwarding destination layer 3 address and have an identical forwarding destination layer 3 interface and an identical packet destination layer 3 address, into the layer 2-layer 3-integrated forwarding table, the direct route VRF table updating module adding a VRF identifier group of each direct route introduced in the layer 2-layer 3-integrated forwarding table to each corresponding entry including the forwarding destination layer 3 interface and the packet destination layer 3 address in the direct route VRF table.

3. The forwarding apparatus in accordance with claim 1, wherein the layer 2-layer 3-integrated forwarding table has a field for storing a type of each communication route that identifies whether the communication route is introduced by the route introducer or by the address resolving module, the forwarding apparatus further including:

a deletion module configured to, in the case of invalid adjacent device layer 3 address-to-layer 2 address correspondence relation, check the type of each of any entry in the layer 2-layer 3-integrated forwarding table, which has a forwarding destination layer 3 interface and a forwarding destination layer 3 address identical with the layer 3 interface and the layer 3 address of the adjacent device, and to set an 'unresolved' forwarding destination layer 2 address for the entry having the type of the communication route introduced by the route introducer, while deleting the entry having the type of the communication route introduced by the address resolving module.

4. The forwarding apparatus in accordance with claim 3, the forwarding apparatus further including:

multiple counters provided corresponding to multiple counting targets including a whole apparatus, individual VRFs, and individual layer 3 interfaces;

a counter adder configured to, in the case of introduction of an entry including the adjacent device layer 3 address-to-layer 2 address correspondence relation into the layer 2-layer 3-integrated forwarding table, respectively increment by one a value of the counter provided for the whole apparatus, a value of the counter provided for a VRF as a search condition for specifying a forwarding destination of a packet in the introduced entry, and a value of the counter provided for a forwarding destination layer 3 interface of the introduced entry; and a counter subtractor configured to, in the case of deletion of an entry by introduction of the adjacent device layer 3 address-to-layer 2 address correspondence relation from the layer 2-layer 3-integrated forwarding table, respectively decrement by one the value of the counter provided for the whole apparatus, a value of the counter provided for a VRF as a search condition for specifying a forwarding destination of a packet in the deleted entry, and a value of the counter provided for a forwarding destination layer 3 interface of the deleted entry.

5. The forwarding apparatus in accordance with claim 4, the forwarding apparatus further including:

a user interface processor configured to transmit information to and from a terminal device operated by an operator, the user interface processor having a counter value transmitter configured to send a value of each counter to the terminal device, in response to reception of a command for obtaining values of the multiple counters from the terminal device.

6. The forwarding apparatus in accordance with claim 4, the forwarding apparatus further including:

an upper limit storage module configured to store an upper limit set in advance for each of the multiple counters, wherein the address resolving module has an introduction prohibition module configured to prohibit introduction of the adjacent device layer 3 address-to-layer 2 address correspondence relation into the layer 2-layer 3-integrated forwarding table, when a value of at least one of the multiple counters reaches or exceeds the upper limit set for the counter.

7. The forwarding apparatus in accordance with claim 6, the forwarding apparatus further including:

a user interface processor configured to transmit information to and from a terminal device operated by an operator, the user interface processor having:

an upper limit change command receiving module configured to receive a command for changing at least one of the upper limits stored in the upper limit storage module from the terminal device; and an upper limit changing module configured to change at least one upper limit among the upper limits stored in the upper limit storage module, in response to the command received by the upper limit change command receiving module.

8. A forwarding apparatus including multiple VPN routing and forwarding tables (VRFs) configured to individually have routing tables provided for respective virtual private networks (VPNs), wherein each of the routing tables is structured to record a communication route of a packet based on a layer 3 address specifying an address of the packet and a forwarding destination layer 3 address specifying a forwarding destination of the packet from an assigned VRF or a VRF assigned to the routing table, as well as an extranet communication route of forwarding the packet from the assigned VRF to another VRF, the forwarding apparatus comprising:

a first storage module configured to store a layer 2-layer 3-integrated forwarding table structured to record at least one entry, wherein each entry includes VRF information and a packet destination layer 3 address as search conditions for specifying the forwarding destination of the packet, as well as a forwarding destination layer 3 interface, a forwarding destination layer 3 address, and a forwarding destination layer 2 address as search results, when a correspondence relation of the forwarding destination layer 3 address to the forwarding destination layer 2 address is unresolved for an entry, the entry including specific data representing an 'unresolved' state of the forwarding destination layer 2 address;

a route introducer configured to introduce each communication route, which is recorded in each of the routing tables, into the layer 2-layer 3-integrated forwarding table;

an address resolving module configured to introduce a correspondence relation of a layer 3 address to a layer 2 address of an adjacent device as an adjacent device layer 3 address-to-layer 2 address correspondence relation with regard to the forwarding destination layer 3 interface of an entry recorded in the layer 2-layer 3-integrated forwarding table, into the layer 2-layer 3-integrated forwarding table; and a forwarding destination identification module configured to search the layer 2-layer 3-integrated forwarding table with a layer 3 address specifying an address recorded in the packet as a search key to specify the forwarding destination of the packet, in response to presence of an entry, which includes a direct route using a packet destination layer 3 address as the forwarding destination layer 3 address and the VRF information as the search condition for specifying the forwarding destination of the packet that is different from a VRF assigned to the forwarding destination layer 3 interface, in the layer 2-layer 3-integrated forwarding table, the address resolving module utilizing VRF information identical with the VRF information as the search condition to introduce the adjacent device layer 3 address-to-layer 2 address correspondence relation into the layer 2-layer 3-integrated forwarding table;

a determination module configured to, upon specification of an 'unresolved' forwarding destination layer 2 address as a result of the search in the layer 2-layer 3-integrated forwarding table by the forwarding destination identification module, determine whether a corresponding entry as the result of the search is related to the direct route using the packet destination layer 3 address as the forwarding destination layer 3 address and whether a VRF as the search condition for specifying the forwarding destination of the packet is different from the VRF assigned to the forwarding destination layer 3 interface;

a retrieval module configured to, in response to an affirmative determination by the determination module, search the layer 2-layer 3-integrated forwarding table with a forwarding destination layer 3 interface and a packet destination layer 3 address of the corresponding entry with the affirmative determination as search keys to retrieve a condition-satisfying adjacent device layer 3 address-to-layer 2 address correspondence relation; and a first introduction module configured to, when the condition-satisfying adjacent device layer 3 address-to-layer 2 address correspondence relation retrieved by the retrieval module has already been learnt, use a packet-receiving VRF for the VRF information as the search condition for specifying the forwarding destination of the packet to introduce the learnt adjacent device layer 3 address-to-layer 2 address correspondence relation into the layer 2-layer 3-integrated forwarding table.

9. The forwarding apparatus in accordance with claim 8, wherein the address resolving module further has:

a second introduction module configured to, when the condition-satisfying adjacent device layer 3 address-to-layer 2 address correspondence relation retrieved by the retrieval module has not yet been resolved, introduce a certain entry into the layer 2-layer 3-integrated forwarding table, wherein the certain entry includes the packet-receiving VRF for the VRF information as the search condition for specifying the forwarding destination of the packet, the packet destination layer 3 address of the corresponding entry for the layer 3 address as the search condition, the forwarding destination layer 3 interface of the corresponding entry as the forwarding destination layer 3 interface, the packet destination layer 3 address as the forwarding destination layer 3 address, and a value representing an 'unresolved state' as the forwarding destination layer 2 address.

10. The forwarding apparatus in accordance with claim 8, wherein the layer 2-layer 3-integrated forwarding table has a field for storing a type of each communication route that identifies whether the communication route is introduced by the route introducer or by the address resolving module, the forwarding apparatus further including:

a deletion module configured to, in the case of invalid adjacent device layer 3 address-to-layer 2 address correspondence relation, check the type of each of any entry in the layer 2-layer 3-integrated forwarding table, which has a forwarding destination layer 3 interface and a forwarding destination layer 3 address identical with the layer 3 interface and the layer 3 address of the adjacent device, and to set an 'unresolved' forwarding destination layer 2 address for the entry having the type of the communication route introduced by the route introducer, while deleting the entry having the type of the communication route introduced by the address resolving module.

11. The forwarding apparatus in accordance with claim 10, the forwarding apparatus further including:

multiple counters provided corresponding to multiple counting targets including a whole apparatus, individual VRFs, and individual layer 3 interfaces;

a counter adder configured to, in the case of introduction of an entry including the adjacent device layer 3 address-to-layer 2 address correspondence relation into the layer 2-layer 3-integrated forwarding table, respectively increment by one a value of the counter provided for the whole apparatus, a value of the counter provided for a VRF as a search condition for specifying a forwarding destination of a packet in the introduced entry, and a value of the counter provided for a forwarding destination layer 3 interface of the introduced entry; and a counter subtractor configured to, in the case of deletion of an entry by introduction of the adjacent device layer 3 address-to-layer 2 address correspondence relation from the layer 2-layer 3-integrated forwarding table, respectively decrement by one the value of the counter provided for the whole apparatus, a value of the counter provided for a VRF as a search condition for specifying a forwarding destination of a packet in the deleted entry, and a value of the counter provided for a forwarding destination layer 3 interface of the deleted entry.

12. The forwarding apparatus in accordance with claim 11, the forwarding apparatus further including:
a user interface processor configured to transmit information to and from a terminal device operated by an operator,
the user interface processor having a counter value transmitter configured to send a value of each counter to the terminal device, in response to reception of a command for obtaining values of the multiple counters from the terminal device.

13. The forwarding apparatus in accordance with claim 11, the forwarding apparatus further including:
an upper limit storage module configured to store an upper limit set in advance for each of the multiple counters,
wherein the address resolving module has an introduction prohibition module configured to prohibit introduction of the adjacent device layer 3 address-to-layer 2 address correspondence relation into the layer 2-layer 3-integrated forwarding table, when a value of at least one of the multiple counters reaches or exceeds the upper limit set for the counter.

14. The forwarding apparatus in accordance with claim 13, the forwarding apparatus further including:
a user interface processor configured to transmit information to and from a terminal device operated by an operator,
the user interface processor having:
an upper limit change command receiving module configured to receive a command for changing at least one of the upper limits stored in the upper limit storage module from the terminal device; and
an upper limit changing module configured to change at least one upper limit among the upper limits stored in the upper limit storage module, in response to the command received by the upper limit change command receiving module.

15. A forwarding method effected in a forwarding apparatus including multiple VPN routing and forwarding tables (VRFs) configured to individually have routing tables provided for respective virtual private networks (VPNs), the forwarding method comprising
structuring each of the routing tables to record a communication route of a packet based on a layer 3 address specifying an address of the packet and a forwarding destination layer 3 address specifying a forwarding destination of the packet from an assigned VRF or a VRF assigned to the routing table, as well as an extranet communication route of forwarding the packet from the assigned VRF to another VRF,
storing a layer 2-layer 3-integrated forwarding table structured to record at least one entry, wherein each entry includes VRF information and a packet destination layer 3 address as search conditions for specifying the forwarding destination of the packet, as well as a forwarding destination layer 3 interface, a forwarding destination layer 3 address, and a forwarding destination layer 2 address as search results, when a correspondence relation of the forwarding destination layer 3 address to the forwarding destination layer 2 address is unresolved for an entry, the entry including specific data representing an 'unresolved' state of the forwarding destination layer 2 address;
introducing, via a route introducer, each communication route, which is recorded in each of the routing tables, into the layer 2-layer 3-integrated forwarding table;
introducing, via an address resolving module, a correspondence relation of a layer 3 address to a layer 2 address of an adjacent device as an adjacent device layer 3 address-to-layer 2 address correspondence relation with regard to the forwarding destination layer 3 interface of an entry recorded in the layer 2-layer 3-integrated forwarding table, into the layer 2-layer 3-integrated forwarding table; and
searching, via a forwarding destination identification module, the layer 2-layer 3-integrated forwarding table with a layer 3 address specifying an address recorded in the packet as a search key to specify the forwarding destination of the packet,
in response to presence of an entry, which includes a direct route using a packet destination layer 3 address as the forwarding destination layer 3 address and the VRF information as the search condition for specifying the forwarding destination of the packet that is different from a VRF assigned to the forwarding destination layer 3 interface, in the layer 2-layer 3-integrated forwarding table, the address resolving module utilizing VRF information identical with the VRF information as the search condition to introduce the adjacent device layer 3 address-to-layer 2 address correspondence relation into the layer 2-layer 3-integrated forwarding table;
storing, via a second storage module, a direct route VRF table that is structured to record at least one entry, wherein each entry includes a correspondence relation of a layer 3 interface and a layer 3 address to a VRF identifier group,
wherein the address resolving module searches the direct route VRF table with a layer 3 interface connected to the adjacent device and the layer 3 address of the adjacent device as search keys to obtain a VRF identifier group and uses each VRF identifier of the obtained VRF identifier group for the VRF information as the search condition of specifying the forwarding destination of the packet to introduce the adjacent device layer 3 address-to-layer 2 address correspondence relation into the layer 2-layer 3-integrated forwarding table.

16. A forwarding method effected in a forwarding apparatus including multiple VPN routing and forwarding tables (VRFs) configured to individually have routing tables provided for respective virtual private networks (VPNs), the forwarding method comprising
structuring each of the routing tables to record a communication route of a packet based on a layer 3 address specifying an address of the packet and a forwarding destination layer 3 address specifying a forwarding destination of the packet from an assigned VRF or a VRF assigned to the routing table, as well as an extranet communication route of forwarding the packet from the assigned VRF to another VRF,
storing a layer 2-layer 3-integrated forwarding table structured to record at least one entry, wherein each entry includes VRF information and a packet destination layer 3 address as search conditions for specifying the forwarding destination of the packet, as well as a forwarding destination layer 3 interface, a forwarding destination layer 3 address, and a forwarding destination layer 2 address as search results, when a correspondence relation of the forwarding destination layer 3 address to the forwarding destination layer 2 address is unresolved for an entry, the entry including specific data representing an 'unresolved' state of the forwarding destination layer 2 address;

introducing, via a route introducer, each communication route, which is recorded in each of the routing tables, into the layer 2-layer 3-integrated forwarding table;

introducing, via an address resolving module, a correspondence relation of a layer 3 address to a layer 2 address of an adjacent device as an adjacent device layer 3 address-to-layer 2 address correspondence relation with regard to the forwarding destination layer 3 interface of an entry recorded in the layer 2-layer 3-integrated forwarding table, into the layer 2-layer 3-integrated forwarding table; and searching, via a forwarding destination identification module, the layer 2-layer 3-integrated forwarding table with a layer 3 address specifying an address recorded in the packet as a search key to specify the forwarding destination of the packet, in response to presence of an entry, which includes a direct route using a packet destination layer 3 address as the forwarding destination layer 3 address and the VRF information as the search condition for specifying the forwarding destination of the packet that is different from a VRF assigned to the forwarding destination layer 3 interface, in the layer 2-layer 3-integrated forwarding table, the address resolving module utilizing VRF information identical with the VRF information as the search condition to introduce the adjacent device layer 3 address-to-layer 2 address correspondence relation into the layer 2-layer 3-integrated forwarding table;

determining, via a determination module, upon specification of an 'unresolved' forwarding destination layer 2 address as a result of the search in the layer 2-layer 3-integrated forwarding table by the forwarding destination identification module, whether a corresponding entry as the result of the search is related to the direct route using the packet destination layer 3 address as the forwarding destination layer 3 address and whether a VRF as the search condition for specifying the forwarding destination of the packet is different from the VRF assigned to the forwarding destination layer 3 interface;

searching, via a retrieval module, in response to an affirmative determination by the determination module, the layer 2-layer 3-integrated forwarding table with a forwarding destination layer 3 interface and a packet destination layer 3 address of the corresponding entry with the affirmative determination as search keys to retrieve a condition-satisfying adjacent device layer 3 address-to-layer 2 address correspondence relation; and using, when the condition-satisfying device layer 3 address-to-layer 2 address correspondence relation retrieved by the retrieval module has already been learnt, a packet-receiving VRF for the VRF information as the search condition for specifying the forwarding destination of the packet to introduce the learnt adjacent device layer 3 address-to-layer 2 address correspondence relation into the layer 2-layer 3-integrated forwarding table.

* * * * *